(12) United States Patent
Creech et al.

(10) Patent No.: US 12,488,395 B1
(45) Date of Patent: Dec. 2, 2025

(54) SYSTEM AND METHOD FOR VERIFYING 3D PRINTED STRUCTURAL DAMAGE CLAIMS

(71) Applicant: UIPCO, LLC, San Antonio, TX (US)

(72) Inventors: Charlotte Thomas Creech, San Antonio, TX (US); Michael Kyne, Saint Petersburg, FL (US); Madhusudhana Rao Abburi, San Antonio, TX (US); Shayla Leigh Callis, Simi Valley, CA (US); Steven Robert Seigler, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/417,203

(22) Filed: Jan. 19, 2024

Related U.S. Application Data

(60) Provisional application No. 63/480,736, filed on Jan. 20, 2023.

(51) Int. Cl.
 *G06Q 40/08* (2012.01)
(52) U.S. Cl.
 CPC .................... *G06Q 40/08* (2013.01)
(58) Field of Classification Search
 CPC ...................................... G06Q 40/08
 See application file for complete search history.

(56) References Cited

U.S. PATENT DOCUMENTS

| | | | |
|---|---|---|---|
| 7,966,200 B1 * | 6/2011 | Hopkins | G06Q 40/08 705/4 |
| 2012/0310786 A1 | 12/2012 | Suzuki | |
| 2014/0278681 A1 | 9/2014 | Cox | |
| 2015/0052024 A1 | 2/2015 | Apsley | |
| 2015/0064299 A1 | 3/2015 | Koreis | |
| 2016/0086254 A1 | 3/2016 | Tapley | |
| 2018/0081334 A1 | 3/2018 | Bostick | |
| 2018/0094953 A1 | 4/2018 | Colson | |
| 2022/0230180 A1 | 7/2022 | Singh | |

(Continued)

OTHER PUBLICATIONS

Office Action mailed Jul. 1, 2025 for U.S. Appl. No. 18/417,174.

(Continued)

*Primary Examiner* — Edward Chang
(74) *Attorney, Agent, or Firm* — Plumsea Law Group, LLC

(57) ABSTRACT

A system and method for verifying and managing claims involving three-dimensional (3D) print structures and components thereof is disclosed. The system employs a verification model that is trained to detect whether a given structure includes a 3D printed portion, as well as the type of 3D print mixture used and/or its manufacturer. This information can be used to reduce the likelihood of fraud by insured persons following damage to their insured structures. In some embodiments, the information can also be used to determine whether a subrogation clause should be triggered, and the 3D print replacement part be requested for printing from the manufacturer. In another example, the damaged 3D printed part can be printed by a local service partner in or near the region where the damaged structure is located, and installation performed by a trusted contractor.

20 Claims, 19 Drawing Sheets

(56) References Cited

U.S. PATENT DOCUMENTS

2022/0404795 A1 12/2022 Rodriguez Bravo
2023/0256514 A1 8/2023 Lymperopoulos

OTHER PUBLICATIONS

Office Action mailed Jun. 17, 2025 for U.S. Patent Application No. 18/417, 189.
Macdonald, E., Salas, R., Espalin, D., Perez, M., Aguilera, E., Muse, D., & Wicker, R. B. (2014). 3D printing for the rapid prototyping of structural electronics. IEEE access, 2, 234-242. (Year: 2014).

* cited by examiner

SYSTEM AND METHOD FOR VERIFYING 3D PRINTED STRUCTURAL DAMAGE CLAIMS

CROSS-REFERENCE TO RELATED APPLICATION

This application claims the benefit of U.S. Provisional Patent Application Ser. No. 63/480,736 filed on Jan. 20, 2023 and titled "System and Method for Verifying 3D Printed Structural Damage Claims", the disclosure of which is incorporated by reference herein in its entirety.

TECHNICAL FIELD

The present disclosure generally relates to structural assessments, and in particular to systems and methods for assessing build materials of a structure using aerial imagery to improve verification of claims for damage.

BACKGROUND

Insurance claim management typically includes a great deal of manual input and analysis by members of an insurance company. One portion of claims processing that can take a great deal of time and resources is the process of having a claims adjuster visit the insured property to assess damage. Although an insurance company can be diligent and send an adjuster or other damage assessment specialist out relatively quickly, the adjuster will need some amount of time to schedule the visit and to get to the appropriate location at the time of the scheduled visit. The adjuster requires a fixed amount of overhead (vehicle, office, equipment) to perform his or her tasks. The time the adjuster spends traveling is not useful to the insurance company or the insured, and it may be that an adjuster can see one or two cases on any given day due to the location of the insured property. There may also be a delay between the time the adjuster views the property and the time the report is prepared and submitted to the insurer. In some situations, the initial adjuster sent out to assess the damage may not have the necessary expertise to assess a specific type of damage. In those situations, a different specialist would need to be contacted and scheduled for a follow-up visit at later time.

In particular, with the advent of new technologies such as 3D printing of buildings such as residential homes, claims can include specialty information that can greatly impact the home's value and the insurer's response which must be verified before a claim can be processed. Accordingly, there is a need for providing a more efficient way of utilizing adjuster resources to improve claim processing time and reduce costs for the insurer.

There is a need in the art for a system and method that addresses the shortcomings discussed above.

SUMMARY

In one aspect, a method of verifying damage to three-dimensional (3D) printed components is disclosed. The method includes a first step of receiving, at a claim verification system, information indicating damage to a first property, and a second step of determining, at the claim verification system, that a first loss described in the information involves a first structure that was purportedly manufactured using 3D printing techniques. In addition, a third step includes receiving, at the claim verification system, first image data of the first structure, and a fourth step includes passing, at the claim verification system, the first image data through a 3D print detection model and generating a first output. Furthermore, the method includes a fifth step of determining, at the claim verification system and based on the first output, the first structure has a high likelihood of including at least a first portion that is associated with a first 3D print resource, and a sixth step of verifying, at the claim verification system and in response to the first portion being associated with the first 3D print resource, the information.

In another aspect, method of reducing the processing of fraudulent claims for damage to three-dimensional (3D) printed components is disclosed. The method includes a first step of receiving, at a claim verification system, a claim submission indicating damage to a first property, and a second step of determining, at the claim verification system, that a first loss described in the claim submission involves a first structure that was purportedly manufactured using 3D printing techniques. A third step includes receiving, at the claim verification system, first image data of the first structure, and a fourth step includes passing, at the claim verification system, the first image data through a 3D print detection model and generating a first output. In addition, the method includes a fifth step of determining, at the claim verification system and based on the first output, the first structure has a low likelihood of including any portion that is associated with a first 3D print resource and that the claim submission is thereby unsubstantiated, and a sixth step of initiating, at a claim management system and based on the unsubstantiated claim submission determination, a follow-up to obtain further data regarding the first structure and the claim submission.

In another aspect, a system for verifying damage to three-dimensional (3D) printed components includes a processor and machine-readable media including instructions which, when executed by the processor, cause the processor to (1) receive, at a claim verification system, information indicating damage to a first property; (2) determine, at the claim verification system, that a first loss described in the information involves a first structure that was purportedly manufactured using 3D printing techniques; (3) receive, at the claim verification system, first image data of the first structure; (4) pass, at the claim verification system, the first image data through a 3D print detection model and generating a first output; (5) determine, at the claim verification system and based on the first output, the first structure has a high likelihood of including at least a first portion that is associated with a first 3D print resource; and (6) verify, at the claim verification system and in response to the first portion being associated with the first 3D print resource, the information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1:
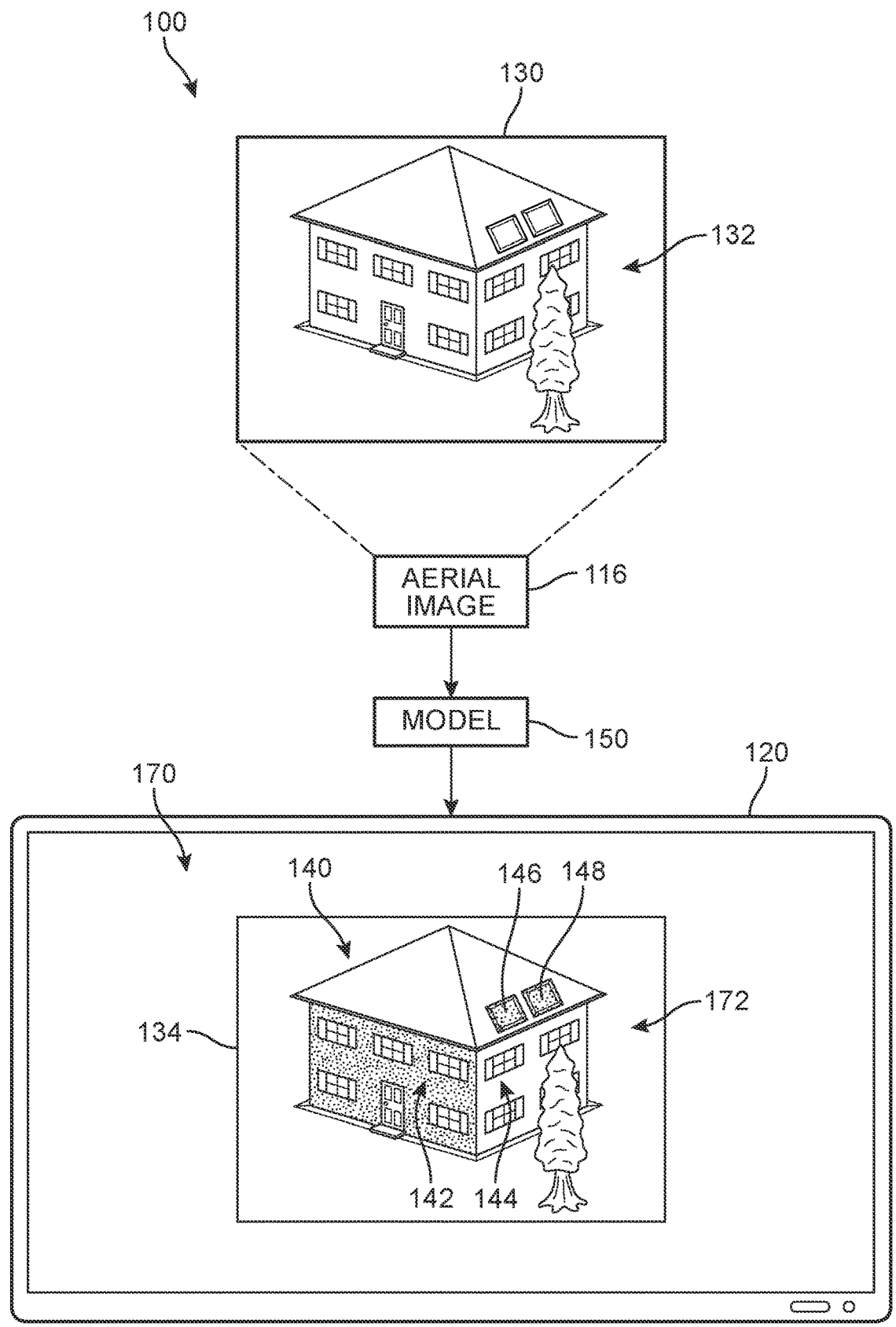
FIG. 1 is a schematic view of a structural assessment being produced after passing an aerial image through a 3DP detection model, according to an embodiment.

The embodiments provide a system and method for improving insurance claim processing transactions. The systems and methods include intelligent machine learning models to automatically determine whether a structure has been built using three-dimensional (3D) printing technologies based on aerial images. In some embodiments, the process can be used to further analyze and generate loss estimations for 3D printed homes. As an example, in many cases, homeowners may not realize or have knowledge of the materials that were used in the construction of their home. When a homeowner seeks coverage for their home, the system can be configured to analyze images of the property and determine the extent of 3D print material or mixture that was used in the structure. The system can be trained on images depicting a wide range of homes that include mixtures of (a) different proportions of 3D print materials and (b) brand names/companies. If any of these 3D-related characteristics in a structure are present, they can then be automatically detected and identified by the system based on images of the structure.

In different embodiments, the analysis would use machine learning, including, possibly, convolutional neural networks (CNNs) to estimate the percent of the home within an image that included the 3D print mixture. This would allow an insurer to more accurately identify the coverage that is appropriate for the home as quickly as possible. In some cases, the information can be validated by reference to an external database (e.g., a property registry) to confirm if the property was indeed built by the identified 3D print company. As will be discussed in greater detail below, in some embodiments, this information could then be used to aid in fraud detection. For example, as insured persons ("members") submit claims for their home and identify one or more portions of the structure as having been purportedly 3D printed, the system could determine whether the claim is consistent with its image analysis. If the images do not support the claim that some portion of the structure was 3D printed, there would be an automatic request for additional information and review to reduce the instances of fraud. Thus, as an example, if an image shows only drywall, but the homeowner has stated that the selected portion was 3D printed, the system would trigger a follow-up phase in which the structure is re-assessed before permitting further processing of the claim.

Furthermore, in different embodiments, verification of a structure's status as having been 3D printed, as well as the type of individual concrete or other printer mixture used in construction the 3D printed home would enable the system to access a manufacturer's disclosed specifications for the given material. Manufacturer data could then be used by the system to determine and/or assign a risk rating variable to the structure. Thus, the manufacturer's stated warranty based on the make-up of their own proprietary concrete mix, as well as the composition of the mixture itself, can be factors that are integrated by the system during underwriting of the structure, as well as a reference in determining how claims for damage should be handled. In scenarios where damage is the result of an event that was within the manufacturer's specified tolerances described for the mixture, the system can be configured to route some aspects of the responsibility for the repairs to the manufacturer.

For example, when a homeowner submits a claim for damage that has occurred in a structure that was printed by a 3D print manufacturer, an intelligent model would determine whether to send the 3D print request to the 3D print manufacturer based on the whether the structure withstood the warranty specifications for the material. In other words, in some embodiments, the proposed methods and systems can automatically route printing requests to a specific company based on whether a subrogation clause was triggered. Subrogation clauses are frequently used in the real estate industry and insurance industry and allows insurance companies to follow a lawful claim against a third party that caused damages to the insured. Conventionally, this process is time-consuming and requires an investment of manual administrative steps involving multiple communications between the insurance company and the responsible third party. Because of the ability to recover costs through subrogation, insurance companies can keep premiums lower, allowing members to benefit. Additionally, the process of subrogation prevents drivers from having to wait months, or even years, for fault to be determined and claims to be paid out after an accident. It can be appreciated that a system for determining whether a subrogation process should be initiated and an automated request for the replacement of a 3D-printed structure (or component thereof) being generated by the system can vastly improve the recovery process for both insurance companies and their members.

In addition, even in cases where subrogation is waived or otherwise inapplicable, a system that can automatically determine if there is damage to a member's 3D printed structure (e.g., via embedded sensors, aerial imagery, claim submissions, etc.) can be used to route recovery tasks to an appropriate vendor. For example, if the damage involved a 3D printed structure, such as a door, as an alternative to a monetary payout, the system could submit a request to a partner service provider such as a hardware outlet (e.g., Lowe's®, HomeDepot®, etc.) that has a 3D printer onsite. In response to the request, the service provider could print the structure exactly per specifications. In some embodiments, payments could be handled directly between the system and provider, without requiring the homeowner to engage. In one embodiment, a licensed contractor registered with the system could be scheduled to deliver and install the printed piece at the member's home. This process would streamline repairs and allow the homeowner to step back from the stress of recovery by moving the homeowner directly to the print and rebuild stage.

Additive manufacturing (AM), also known as three-dimensional printing (3DP), has the advantages of high building efficient, low labor cost and less construction wastes compared to traditional construction technology. 3D printed concrete is a special type of concrete, which can be deposited through a 3D printer layer by layer without any formwork support and vibration process. Its important performance indexes, including workability, setting and hardening time, and mechanical properties, can be optimized by materials selection and printing parameters. To date, many building structures have been successfully printed using 3D printed concrete technology.

A diverse range of materials can be 3D printed as a result of fast development in additive manufacturing technologies. Materials in the forms of filaments, wire, powder, paste, sheets, and inks can be used for 3D printing. Polymers are one of the most common 3D print materials that have been developed for aerospace, automotive, sports, medical, architectural and toy industries. Polymers used in 3D printing are mainly in the form of filaments in FDM (the most common method), powders or auxiliary binder in the powder-bed method or resins in stereolithography. Thermoplastic polymers such as acrylonitrile-butadiene-styrene copolymers (ABS), polyamide (PA), polycarbonate (PC) and polylactic acid (PLA), and thermosetting powders such as polystyrene, polyamides and photopolymer resins, are the most common types of polymers for 3D printing. In addition, the reinforcement of polymers with fibers and nano-materials has been introduced in recent years with the aim of enhancing the mechanical properties of the printed products to be used as load-bearing or functional components. Manufacturers are taking advantage of 3D printing of metals and alloys in the manufacturing of complicated parts of various sizes. Metals are mainly in the form of powders (or wires). SLS, SLM and DED are the main methods of 3D printing which are all based on the fusion of powders by melting or sintering using a laser or electron beam.

In addition, 3D printed ceramics allow for components with a high strength to weight ratio and facilitated the creation of complex ceramic lattices for many applications. Ceramics are mainly 3D printed in the form of powders or ink. Powders are sintered using laser or bond together via an auxiliary adhesive. On the other hand, ink-jet printing is used to print a suspension of ceramic particles followed by post-treatment e.g., high-temperature sintering.

Concrete is the most used man-made material, which is consumed in construction and infrastructure projects around the world. Extrusion is the main method used for the additive manufacturing of concrete, although the powder-bed method is also used. The type of concrete suitable for 3D printing can be very different. As an example, pumpable concrete may not have enough shape-stability and dimensional accuracy after printing, even though it is good for the extrusion process of 3D printing. Self-compacting concrete may not be suitable for 3D printing as it may not hold its shape in the formwork-free method of 3D printing. The type of mixture used can significantly affect the resulting layer-by-layer appearance of the structure.

Current 3D printing technologies can tailor the multifunctional properties of the manufactured parts by combining different materials and controlling their position precisely. Some 3DP manufacturers and builders are able to vary materials between layers, while others can change the materials also within a layer. For instance, high-pressure jetting systems can combine only polymers with good flowability and similar curing temperatures and extrusion-based methods, such as FDM, can couple only materials with similar melting temperatures. Other 3D printing technologies, such as DED, allow for the combination of metal alloys or ceramics, and as a result, more materials can be extruded at the same time.

It can be appreciated that the type of mixture used, its composition, and the approach used to 3D print the component can influence the appearance of the component. In addition, 3D printing allow for a diversity in the design of the structure that is simply not possible in masonry structures. In other words, while a conventional masonry structure is made of discrete elements, such as bricks, with 3 dimensions (height h, length l and width d) which are connected together using mortar to provide stability after it has set, a 3DP object is made of a continuous layer defined by 2 dimensions (its height h and width d). The bonding between layers is provided by the extruded material itself. Thus, while masonry structures are assembled by stacking hundreds or thousands of components, either manually or robotically, with a construction characterized by the repetition of numerous assembly sequences and a high risk of error propagation, 3DP is based on a high number of simple steps, namely the deposition of the extruded material, where the automation of the process and the precision of gantry or industrial robots reduces error propagation. Such digital manufacturing helps to broaden the design space that has been traditionally associated with masonry structures.

In general, the majority of 3D printed housing projects use concrete-like materials, but that are not necessarily concrete. Traditional concrete is unsuitable for 3D printing, as it would clog the printer nozzle and not adhere properly to the previous layers; thus, proprietary concretes are created to avoid these issues. 3DP manufacturers use a mixture of cement, sand (or crushed stone or gravel), fibers, and occasionally other materials. Furthermore, many parties in the 3DP industry have developed proprietary concrete mixtures and provide them with closed-use compatibility to their machines. Instead of Portland cement, these companies will include one or more special additives that are not necessarily specified, but that make the mixes functional. These proprietary concretes are typically associated with different guarantees with respect to the structure's long-term durability, as well as make the concrete much easier to 3D print with the standard extruder model, whether using a gantry or standalone machine. Some non-limiting examples of proprietary concrete blends that may be identified by the systems described herein include (a) Apis Cor®'s mixture reportedly using concrete, gypsum, and proprietary materials developed by the company, a mixture that is limited for sale for use with their own printer and company; (b) Icon®'s proprietary cementitious-based material, 'Lavacrete', as well as 3DP insulation, and steel; (c) Winsun®'s proprietary Special Reinforced Concrete; (d) SQ4D®'s SQ4D® concrete; (e) and DFab®'s concrete mix specifically formulated for 3D printing construction that includes an additive ingredient referred to as COBOD®'s Magic Mix to make the DFab® mix work properly. Other printed materials that may be detected include proprietary mortars, proprietary plastics, proprietary muds, proprietary sands, proprietary waste mixes, proprietary metals, proprietary woods, proprietary crushed stones, as well as proprietary dry mixes that can be used to print various new materials such as Black Buffalo®'s clay, wood, hemp, oyster shells, and colored clays.

Because they must suitable for additive manufacturing, cement mixtures, as well as other materials, must have appropriate rheological and compositional properties in order to ensure an optimal deposition process-ease of extrusion through the nozzle, maintaining the shape after deposition, good adhesion between the printed layers (in order to increase mechanical properties of hardened printing products), and satisfactory stacking without collapsing phenomena—these materials will also be associated with specific, apparent, and observable characteristics. In general, the main differences between traditional cement mixtures and printable mixtures can be related to two aspects: aggregates size and water/cement ratio (w/c ratio). These characteristics can be detected by the machine learning models described herein and used to offer insights and knowledge about structures that were damaged following a disaster, facilitating more accurate estimates of rebuilding costs and a more rapid turnaround for claim payouts to affected residents. Following training, the model is capable of receiving images and generating an assessment in which a determination can be made regarding one or more portions of the structure, and whether they have been produced using 3DP technology, as well as the source and/or identity of the mixture if applicable.

For purposes of clarity, an overview of one embodiment of the proposed systems and methods is illustrated with reference to FIG. 1. In FIG. 1, an embodiment of a portion of a smart assessment system ("system") 100 implemented in part via a computing device 120 is depicted. In different embodiments, the system 100 is configured to receive aerial imagery-based image data 130 that may include views of a structure 132 or portions thereof. Each image 116 is inputted to a trained machine learning model ("model") 150 that automatically assesses the likelihood of the structure including 3DP materials. In other words, the model 150 is configured to automatically identify any portions of the structure 132 that appear to have been built using 3D printing mixture(s) and/or 3D printing technologies. In FIG. 1, one example of model's output 172 is depicted in image representation 134 of the structure 132, for example shown on a display 170 for computing device 120.

In different embodiments, the image representation 134 can depict a building, such as a residence. As used herein, the term "building" or "structure" can refer to any kind of building, such as a home, or other residential building, a shed, barn, a commercial building or any other related structures. A building typically can include a roof, room, walls, support structures, windows, or other features. The image representation 134 can refer generally to a visual reconstruction of the site or aspects thereof. In some embodiments, the image representation 134 can include additional details based on the type of image data used (e.g., RGB, infrared, etc.).

For purposes of this example, the output 172 shows that a front-facing wall 142 of the structure 132 as well as a first skylight 146 and a second skylight 148 were determined to have a high likelihood of having been made using 3DP. In contrast, the remaining portions of the structure 132 such as a sidewall 144 and a roof 140 are deemed to have been built using standard (mason-based) techniques and materials. Although output 172 is shown as a visual image in FIG. 1, it should be understood that in different embodiments the output 172 can be presented in a variety of formats.

Figure 2:
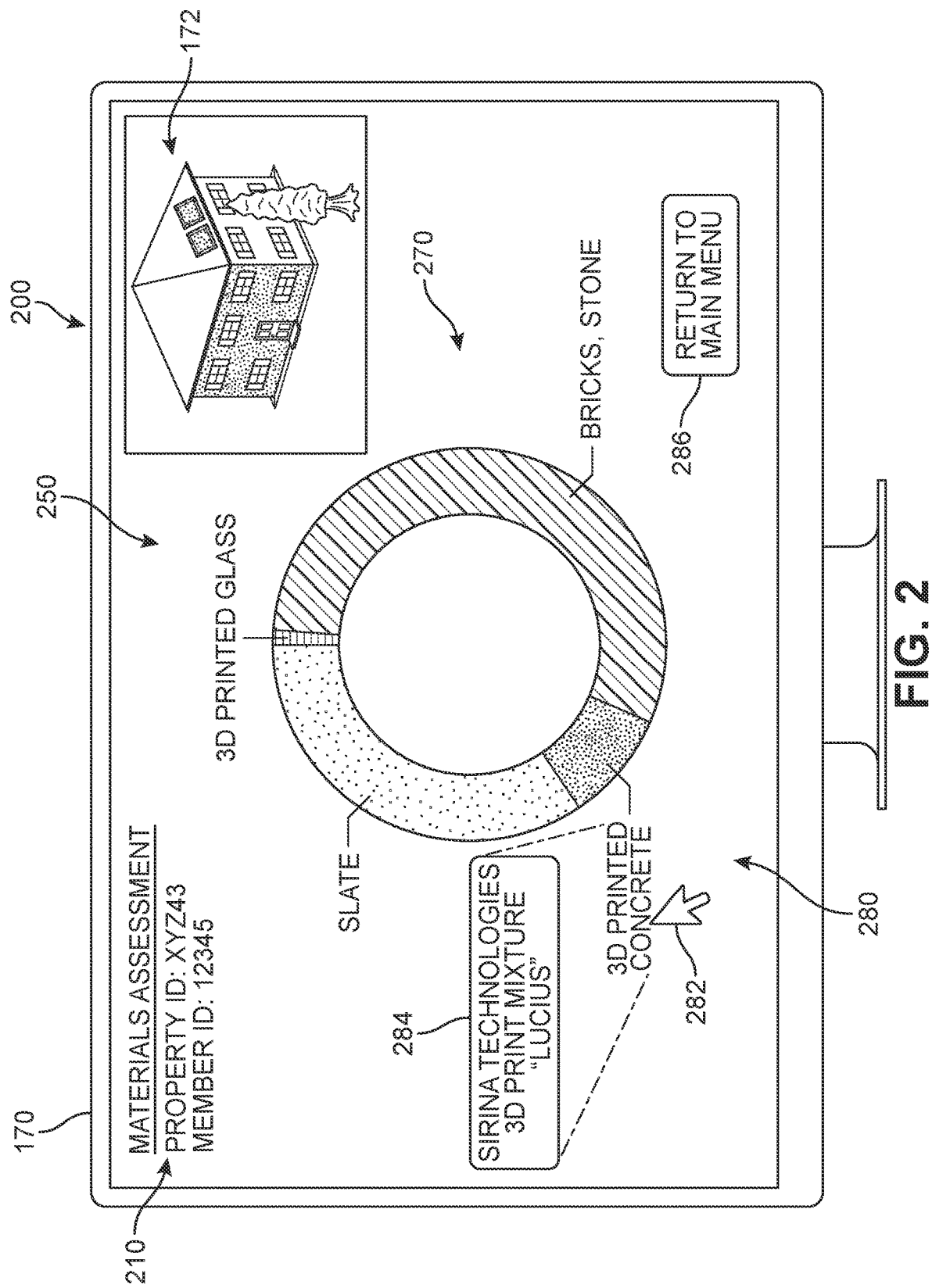
FIG. 2 is an example of a user dashboard presenting information about a damaged structure based on the structural assessment, according to an embodiment.

As noted earlier, the model output can include an assessment that reveals additional details about the property. In some embodiments, the system 100 may be configured to determine what type of material the portion or component identified as having 3DP origin is. One example of this is shown in FIG. 2 as a structural assessment dashboard ("dashboard") 250. The dashboard 250 in this example includes a user interface that presents a chart 270 summarizing the data that has been generated by the model, though in other embodiments the data can be presented, such as a graph, list, spreadsheet, or other report. In some embodiments, the data is made part of a record 210 for a member whose property was assessed. The chart 270 illustrates visually the identified materials of the structure, as well as an estimated proportion of the structure that comprises each material. For example, slate (often used in roof construction) is shown, as well as bricks and stone, which are conventional building materials. In addition, consistent with the FIG. 1, a portion corresponding to the front-facing wall is identified as 3D printed concrete, and the skylights include 3D printed glass. In some embodiments, additional information can be accessed or viewed by hovering a cursor 282 over a selected material (here, the 3D printed concrete), to trigger presentation of data 284 ("Sirina Technologies 3D Print Mixture 'Lucius'").

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons, selectable options (e.g., option 286) or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Figure 3:
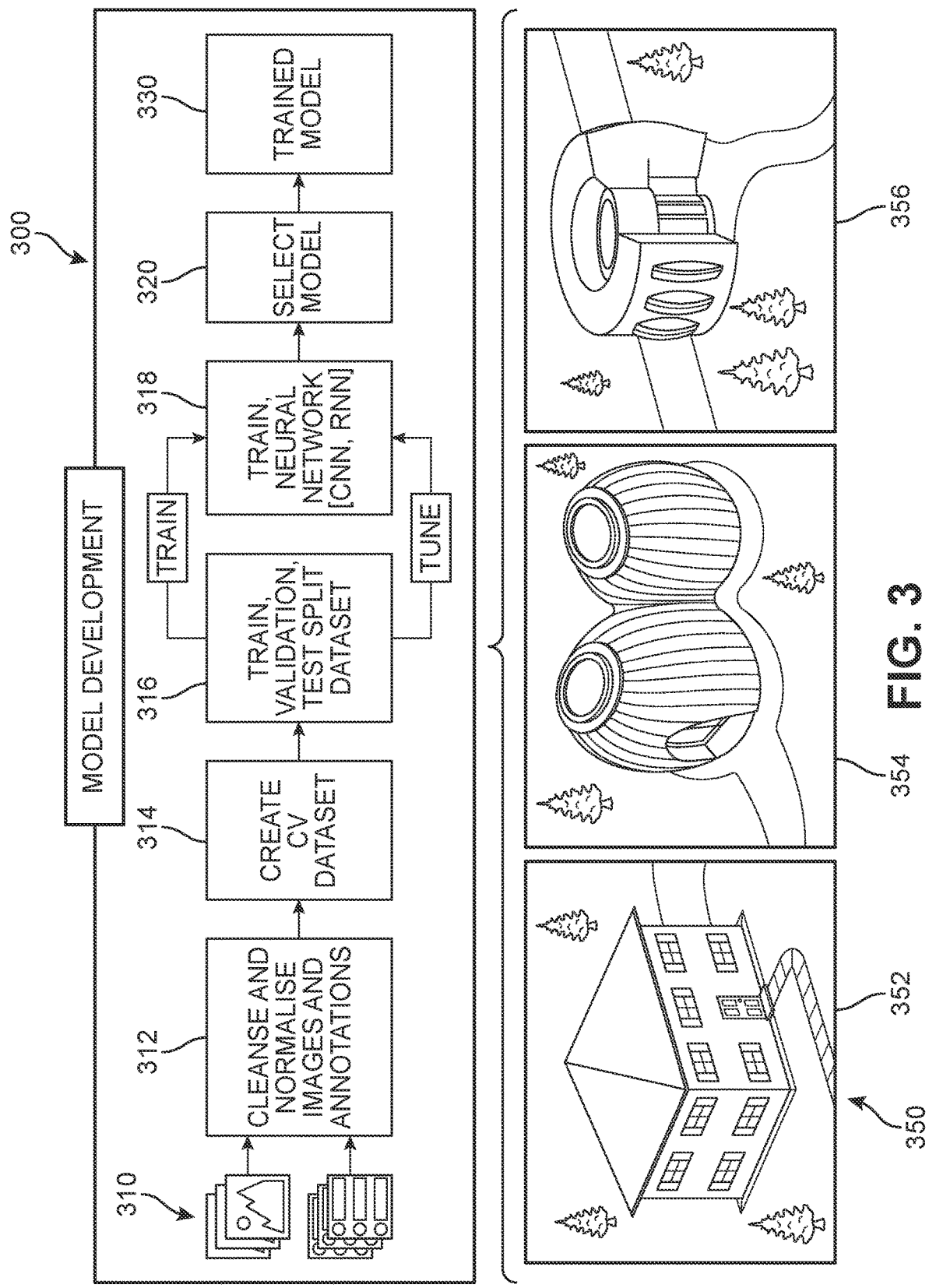
FIG. 3 is a schematic view of an architecture for a 3DP detection classification and training environment, according to an embodiment.

In different embodiments, the systems disclosed herein can include provisions for generating highly accurate assessments of structural compositions. In FIG. 3, one embodiment of a flow process 300 for development and implementation of a machine learning model for detection of structures built with 3DP using image data is shown. The flow process 300 generally represents a model development phase. During the model development, input 310 in the form of imagery and associated annotations is provided to the system. As shown in FIG. 3, in some embodiments, the input 310 includes training image data 350 that includes a wide range of examples of masonry structures, as well as wholly 3DP structures, and combination structures 356 that are built with both masonry and 3DP. For example, training image data 350 includes a first image 352 representing a home built with conventional masonry techniques such as bricks and mortar. A second image 354 includes a building that is wholly 3D printed, as can be appreciated by its unique appearance. The first image 352 and second image 354 can be used to train the model to recognize the difference between a structure with no 3DP and a structure built entirely with 3DP. In addition, a third image 356 shows a home built with 3DP portions and masonry-built portions (partial 3DP). The second image 354 and the third image 356 can be used to train the model to recognize the difference between a completely 3DP structure, and one which had been updated to include one or more 3DP components, portions, repairs, or simply was designed as an amalgamation of techniques. The images can each be associated with annotations that would teach the model how to recognize or identify various relevant features (vehicles, dents, parking spaces, vehicle components, etc.) as well as the type of 3DP material and/or brand/manufacturer or supplier.

In one example, the input 310 can be cleansed and normalized in a first step 312 and a CV dataset is created based on this data in a second step 314. A cycle comprising a third step 316 in which the model is trained, validated, and a split dataset tested followed by a fourth step 318 in which the selected neural network (e.g., CNN, RNN, etc.) is trained and tuned based on the output of third step 316 then occurs. More specifically, machine learning techniques, such as deep learning that includes classification, clustering, and/or other techniques, are applied to the CV dataset to develop the model(s). Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different types of damage. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur. All of these AI systems process enormous amounts of data; for example, Caffe can process over 60 million images per day with a single NVIDIA K40 GPU.

Moreover, in some implementations, the process may employ an estimation engine that uses ML techniques to generate material or mixture recognition with high accuracy. In some embodiments, such techniques may include supervised and/or unsupervised ML techniques. Once a model is selected in a fifth step 320, the trained model is adjusted to fit the intended deployment environment in a sixth step 322, and the resulting trained model 330 is prepared for model implementation.

In different embodiments, the model can be trained to recognize specific features and characteristics in the images in order to (a) determine if any portion of the structure was 3D printed and (b) identify the source (manufacturer) of the 3D printed portion, or the likely proprietary mixtures/composition. In some embodiments, the model can be trained to detect specific indicators of 3DP techniques, such as but not limited to the material's aggregates size, its apparent water/cement ratio, the presence of unconventional building elements (e.g., holes, porous structure, curved structure), the complexity of the component's shape and geometry, the presence of a mixture used exclusively or primarily in 3DP builds, etc.

As a general matter, the aggregates size is crucial regarding the pumping and extruding processes of the cement mixture. To minimize print nozzle obstructions and ensure proper mix fluidity, the optimal size of fine aggregates can be limited (e.g., no more than 300 μm). In addition, some of the 3DP mixtures are also characterized by a certain percentage of coarse sand to improve the strength of the mortar and reduce the shrinkage crack in the printed objects. Several printing technologies use cement mix based on coarse aggregates (Ø>4 mm). The presence of the coarse fraction improves the mechanical properties of the material compared to the printable mortars but requires the use of larger print nozzles. Thus, the model can implement image recognition techniques to detect these types of mixtures.

In addition, the water/cement ratio affects the mix flowability and the mechanical properties of hardened material. Maximizing the mechanical strength in the mix means minimizing the water/cement ratio. However, a certain water amount must be maintained to ensure the appropriate workability of the concrete. The mix in the system must also be flowable but upon pouring must be buildable and able to hold itself and subsequent layers. According to the above requirements, the mixtures suitable for additive manufacturing are made with water/cement ratios between 0.3 and 0.4, lower values when compared with typical values for traditional mortars or concretes (0.53-0.55). Cement can be used to serve the same purpose as it does in a traditional mix, but will be combined with different bases, hydrators and cement additives to advance hydration and help the item keep its shape. Furthermore, finely chopped binders are utilized to help reinforce the material and a fluid component is splashed through the ink stream to help blend the material. Again, the model can be trained to discriminate these types of features in the inputted images in order to determine a likelihood of a 3DP build.

Similarly, in different embodiments, the final product of 3DP build can include and present as a layered structure, which can be detected by the model. The presence of a layered structure implies different mechanical behavior depending on the direction of loading. In some embodiments, depending on the geometry of the printed features, a 3DP building's mixture can be vulnerable to mechanical weakness at various interface zones. To minimize the cracks or collapse of the object, the mixture can be optimized with the addition of fillers or reinforcement materials, which can be visually detected by the model to identify mixture composition. For example, a printable cement mixture optimized with the addition of a certain percentage of copper tailings to replace the sand to improve the mechanical performance of concrete could be identified based on the visual presence of copper tailings. Other examples include the detection of geopolymers, which are inorganic materials with chemical compositions similar to zeolites but with an amorphous structure. Furthermore, because specific 3D print software such as splicer programs are typically used in the design of 3DP houses and other buildings, there can be specific patterns and/or characteristics that are associated with the designs generated by such programs that the model can be trained to detect.

In addition, the architectural freedom offered by 3DP builds based on 3 degrees of freedom (x, y, z) manufacturing allows for the development of highly complex shapes and geometry that can be captured in image data. While traditional manufacturing is based on the use of formwork or molds, 3DP buildings can present as having no "standard" shapes and unique morphology of its components. Some non-limiting examples include multifunctional wall elements aimed at optimizing the thermal properties of the structure (e.g., an absorptive formwork to be filled with insulating foam for thermal insulation) that can have a complex shape (e.g., bi-sinusoidal geometry) and is designed appropriately to reduce the flow of heat through it. The resulting structure consists of internal cavities that optimize thermal insulation while maintaining optimal structural properties. Another example of a functional printed structure that can be detected by the system is an acoustic damping wall. This application is based on cavities of different sizes and shapes to form a vertical structure. These components are described simply for purposes of illustration, and to convey the ability of the trained model to identify unique morphologies in order to determine the likelihood of a 3DP structure being captured in the image data. In still another example, the model can be trained to detect the relative orientations of structural parts, including, for example, the angles between walls and floors, walls and ceilings, and/or between parts of a building and a ground surface, to determine whether the orientations indicate an arrangement of parts or material that would most likely have a 3DP build origin.

Figure 4:
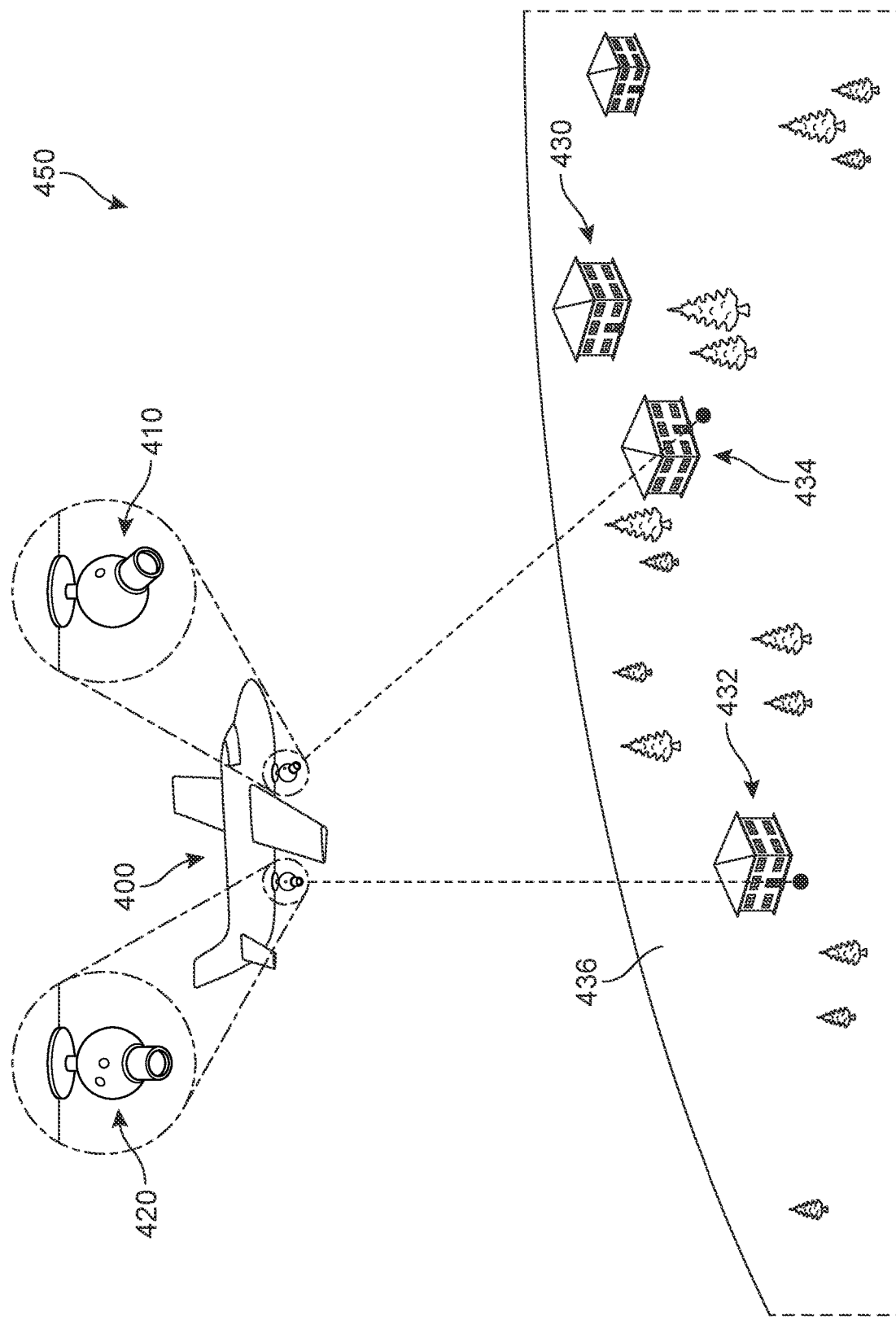
FIG. 4 is an illustration depicting an aerial vehicle capturing images of a structure at a first location, according to an embodiment.

For purposes of illustration, a schematic view of an aerial vehicle 400 performing surveys of a target zone or region 436 is shown in FIG. 4. In FIG. 4, an image survey 450 is performed of a group of structures 430 located in the region 436. As used herein, the term "aerial vehicle" refers to any kind of plane, helicopter, drone, or other flying vehicles. In this exemplary embodiment, aerial vehicle 400, also referred to simply as vehicle 400, is a plane operated by a pilot. However, in other embodiments, vehicle 400 could be remotely operated, autonomous, or pre-programmed.

Vehicle 400 includes at least one camera for capturing images. For purposes of simplicity, in FIG. 4 the vehicle 400 includes both a first camera 410 and a second camera 420, each oriented differently. However, in other embodiments, the vehicle 400 may employ a single camera that is configured to rotate or reorient its lens to capture images at different angles.

In different embodiments, vehicle 400 may also include or be in communication with additional systems to facilitate capturing, processing, and transmitting image information about one or more areas. For example, an environment for a structural assessment system can comprise both a ground system and an aerial system. The ground system includes provisions for gathering information about potentially 3DP structures. The ground system may also include provisions for processing image data and for communicating with various other systems. In addition, the aerial system (represented by vehicle 400) includes provisions for capturing aerial images of one or more areas. The aerial system may also include provisions to determine precise locations for captured images, as well as for performing image processing.

Aerial system may comprise various systems and components that are disposed within an aerial vehicle (such as aerial vehicle 400). As noted above, the aerial system may include one or more cameras for capturing images and information about a building structure. The camera may comprise any kind of camera, including any kind of digital camera and/or range imaging camera. Range imaging cameras include any type of device that can capture range information or range images corresponding to an object in the viewing area of the camera. As used herein, "range images" provide a 2D array of values indicating a depth (or distance measurement). Some exemplary range imaging devices may include structured-light 3D scanners and time-of-flight cameras. Using a time-of-flight camera, the system can capture range images of a scene that can be used to build a 3D model of objects in the scene, such as building structures.

The aerial system can also include a GPS receiver for receiving GPS information that can be used to determine a GPS location for the aerial vehicle. In some embodiments, the aerial system may also include sensors for measuring orientation, altitude, and/or acceleration. For example, an aerial system can include a gyroscope, an altimeter, and an accelerometer. In some embodiments, the aerial system can include an altitude and heading reference system (AHRS). Using these devices, the orientation, heading, and height of the aerial vehicle (and of camera(s)) can be determined. This information, when used with a GPS location for the aerial vehicle, can be used to infer the location of one or more points in an image taken from the aerial vehicle as described in further detail below.

In different embodiments, aerial system can also include an image capture and processing system, also referred to simply as processing system. A processing system may be used to store, process, and transmit image information. Additionally, in some cases, a processing system can receive GPS or other coordinate information about one or more target locations. To facilitate these tasks, image capture and processing systems may include one or more processors as well as memory. Memory can store instructions for programs that facilitate storing, processing, and transmitting image information.

Generally, the ground system comprises a computing system that can include, for example, a computer and a database. The computer may further include one or more processors and memory. The computer could be any kind of computer such as a desktop computer, a laptop computer, a server, or any other kind of computer with sufficient computing resources for performing tasks such as image classification. In some embodiments, the ground system can refer to a plurality of interconnected computing devices and/or cloud service repositories configured to connect over a network. Additionally, models or other information could be stored in a separate model database of the computing system.

Furthermore, in some embodiments, computing system may also include a structure classifier. The structure classifier may be any program or algorithm that is used to classify images according to the type of structure and its likely composition. In some embodiments, structure classifier includes one or more machine learning models. In one embodiment, structure classifier could include a convolutional neural network. In other embodiments, structure classifier could comprise any other algorithm (or set of algorithms) from the field for machine learning and/or machine vision.

In different embodiments, devices and components of the computing system may communicate over a network. Generally, a network could comprise any kind of network, such as but not limited to a Wide Area Network (WAN), a Local Area Network (LAN), Wi-Fi network, Bluetooth or other Personal Area Network, cellular network, as well as other kinds of networks. It may be appreciated that different devices could communicate using different networks and/or communication protocols. In other embodiments, a structural dashboard or modeling application could be configured to run on an end-user device, rather than on a separate system such as a server. In still other embodiments, some components of a structural assessment system could be run on a user device, while other components could be run on a server.

Figure 5:
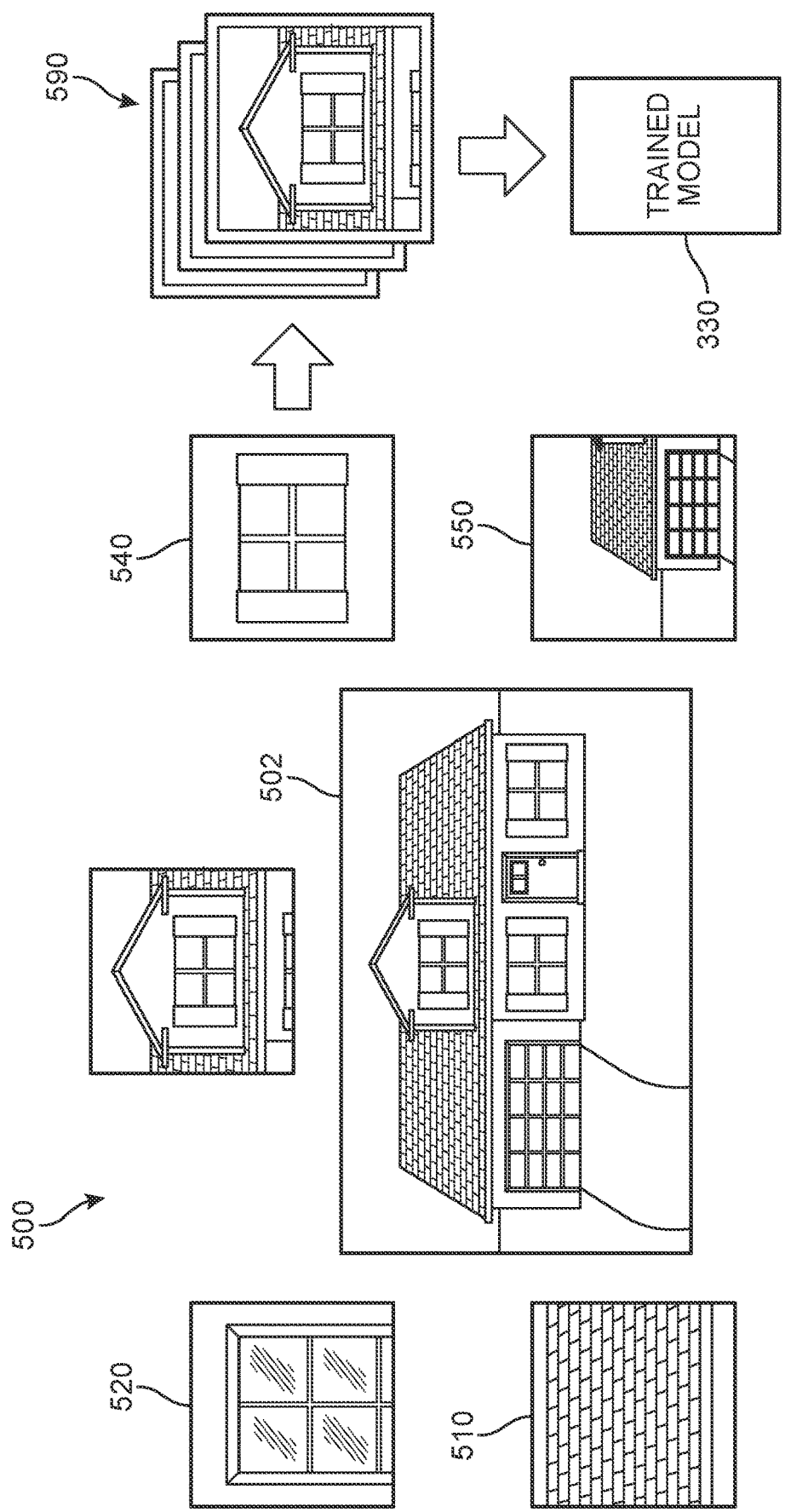
FIG. 5 is an example of a plurality of aerial images being submitted to a trained 3DP detection model, according to an embodiment.

In FIG. 5, an embodiment of a schematic process 500 is shown in which a cluster of images 590 is captured and passed to as input to the trained model 330. In this illustration, a first image 520 of a residence is shown, as well as a second image 510 of the roof, a third image 520 of a first window, a fourth image 530 of a window panel, a fifth image 540 of a second window, and a sixth image 550 of a garage. Each image is shown to represent an example of the types of images that can be submitted to the model for a single structure. In different embodiments, the aerial images can include other structural parts (such as walls, support columns, doors, windows, etc.) and/or components (solar panels, window trimmings, door handles, gutters, ornamental features, etc.). Once the images are received by the trained model 330, a structural assessment can be generated for the selected structure.

Figure 6:
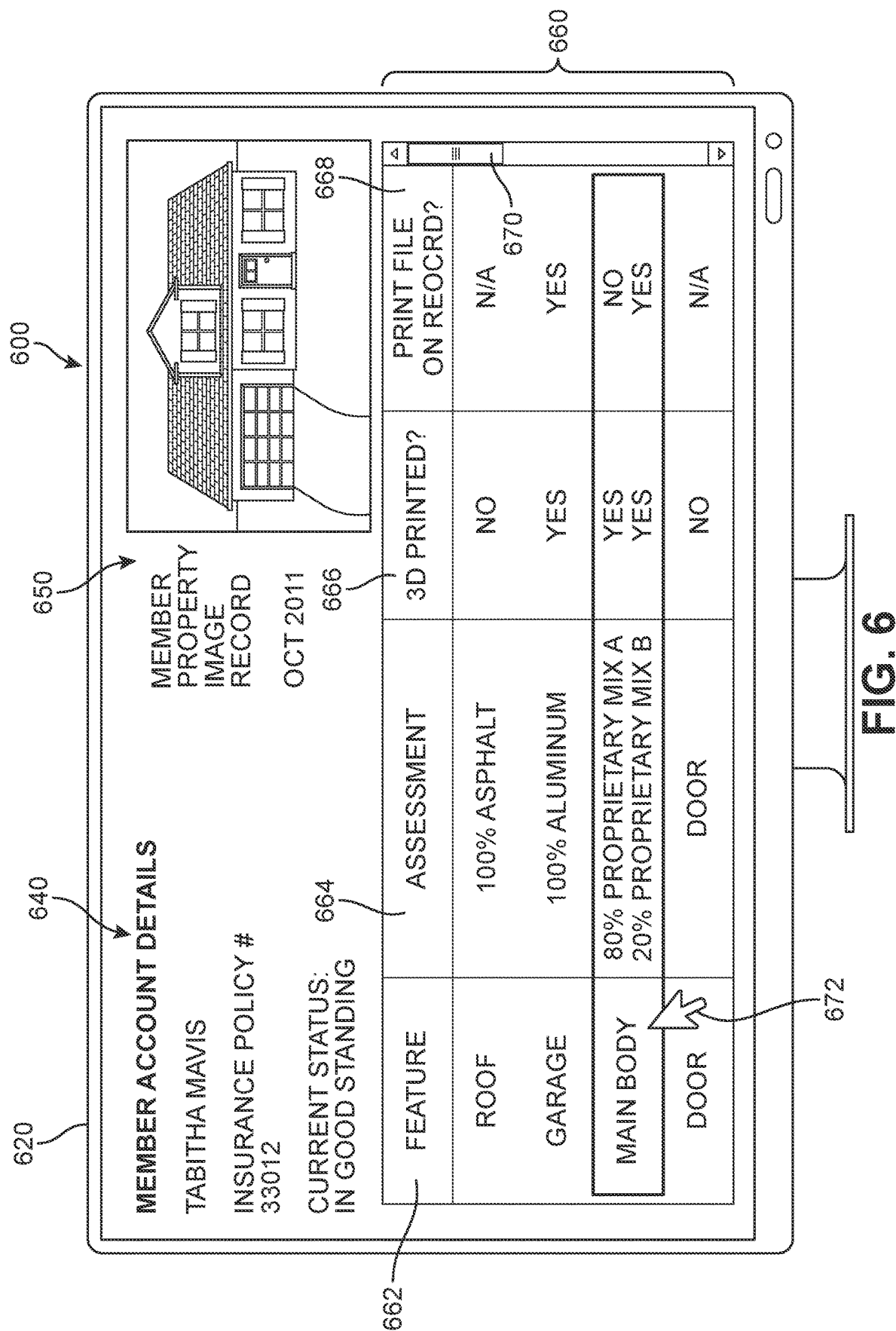
FIGS. 6 and 7 are examples of user interfaces for accessing and interacting with information related to a structural assessment for an insured member account, according to an embodiment.
Figure 7:
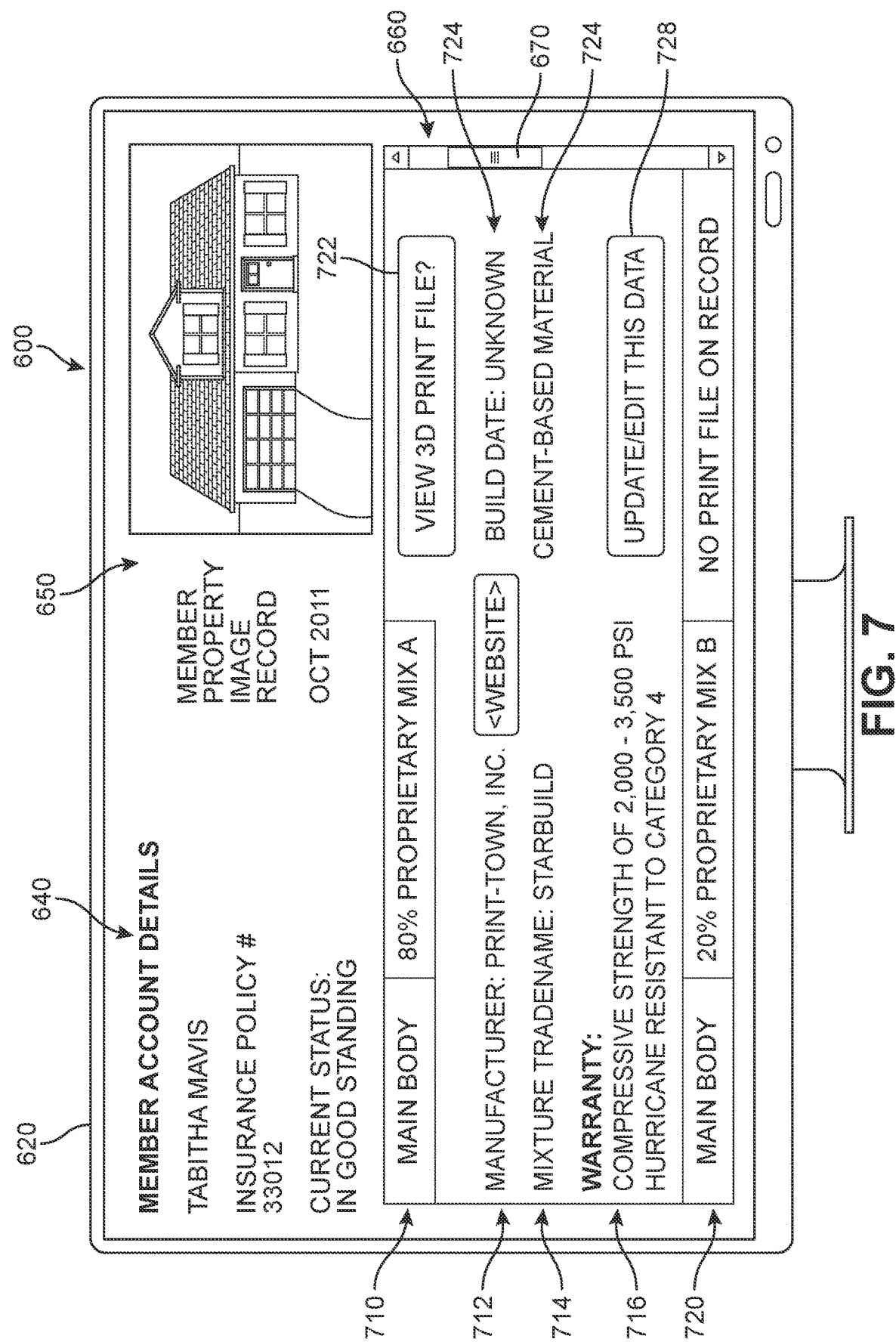

FIGS. 6 and 7 present an embodiment of a structural assessment user interface (UI) 600 that can be generated by the system based on the output provided by the trained model. It should be understood that the UI 150 of FIGS. 6 and 7, as well as other user interfaces or visualization dashboards shown herein (e.g., FIG. 2) represent only some possible depictions of interfaces that may be offered to the end-user, and in other embodiments, any variation in presentation style, options, menus, and graphical depictions can be used, including interfaces customized by the end-user to display the desired information. Other selectable options can also be displayed to allow the end-user to create or modify the account and/or record. In addition, a number of interface layer options may be provided. For example, other options can allow the user to switch to a landing page that presents a brief summary of the member's account or a log of the user's previous activity, or make edits to the current record.

In FIG. 6, the UI 600 is shown on a computing display 620 for a computing device. The UI 600 is currently presenting a first member record 640 (e.g., "Tabitha Mavis/Insurance Policy #33012/Current Status: In Good Standing") associated with a member property image record 650 ("October 2011" being the most recent date of image data collection). In some embodiments, claim information including insured name and claim number or policy number, the exact date and time at which the images were captured, and/or location information can also be shown.

In addition, an interactive assessment report ("report") 660 is included in the UI 600, where various components or portions of the structure associated with the first member record 640 have been automatically recognized and identified by the system and details for each portion presented in a series of rows and columns. For example, a feature column 662 lists the detected features, including in this case, a roof, a garage, a main body of the house, and a door. Additional features may also be shown further below, and viewed for example by using a scroll bar 670. Each feature is associated with an assessment column 664 that recites the most likely material(s) that were used for the feature, a 3DP determination column 666 that reports the likelihood of the feature being of 3DP origin/material, and a print file column 668 indicating whether the record—if including a 3DP feature—includes or has access to the file that includes the digital model of the 3D object that was printed. In other embodiments, additional and/or alternate columns of information can be shown.

In some embodiments, each row in the report 660 can represent a selectable option. For example, an end-user may click or otherwise select a given row (e.g., via a cursor 672) to access or reveal further details associated with that feature that were produced by the model or otherwise included in the record at an earlier time. An example of this interaction following a user selection of the "main body" feature is shown in FIG. 7, where the section has expanded or 'opened' to reveal additional 3DP-related details for the main body. In this example, the main body was determined to include two different proprietary 3DP mixtures, estimated at 80% of a proprietary mix "A" 710 and 20% of a proprietary mix "B". Currently, the UI 600 is presenting details for the proprietary mix "A" 710. However, in some embodiments, a simple scroll-down or selection would reveal the details for the proprietary mix "B" 720.

The details in this example include an identification of manufacturer 712 (e.g., "Print-Town, Inc.") with—when available—a click-friendly website link for the manufacturer, a tradename 714 for the mixture (e.g., "Starbuild"), a warranty summary 716 (e.g., "compressive strength of 2,000-3,500 psi/hurricane resistant to category 4"), a link 722 to navigate to and/or open a 3DP file for the feature (e.g., "View 3D Print File?"), a build date 724 (e.g., "Unknown"), and a mixture composition summary 724 (e.g., "Cement-based material"). In some embodiments, the UI 600 can offer a selectable option 728 to modify the data (e.g., "Update/Edit this Data"). In different embodiments, the system is configured to pull, request, or access various pieces of the data using available internal and external databases. For example, the warranty summary may be retrieved from a database in which warranties for all commercially available 3DP companies and/or mixtures are stored based on the identification of the manufacturer and/or tradename and/or composition. Similarly, the model can be configured to identify the 3DP by reference to a database of annotated images in which each mixture is pre-identified.

Figure 8:
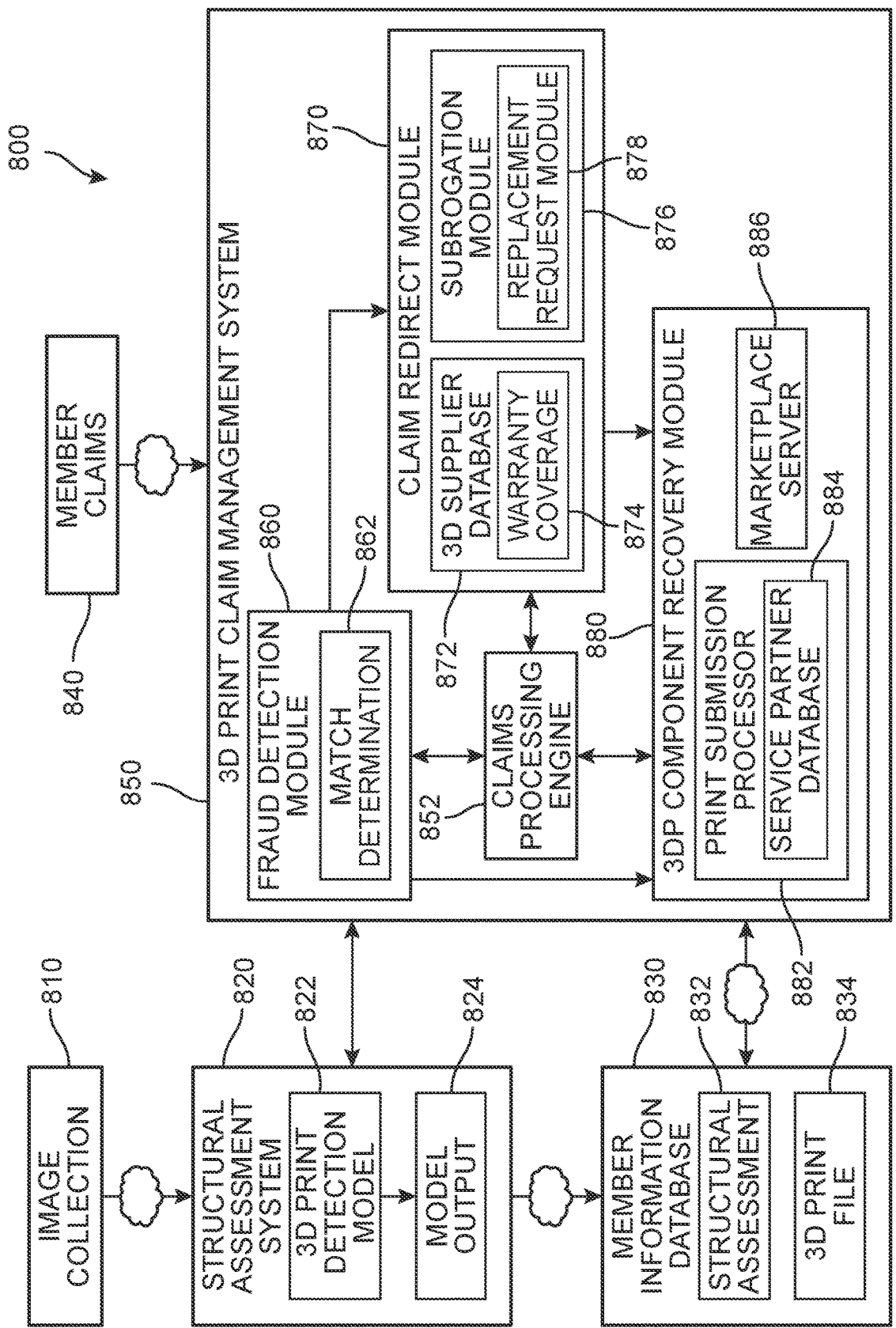
FIG. 8 is a high-level schematic diagram of an environment for implementing the embodiments described herein, according to an embodiment.

Referring now to FIG. 8, an overview of an embodiment of an environment 800 for implementing the systems and methods disclosed herein is depicted. The environment 800 includes an architecture for capturing and processing images of structures in order to assess the structure's 3DP content and facilitate claims processing transactions. In different embodiments, some of the steps may be performed by ground-based computing system(s) and some of the steps may be performed by aerial system(s). In FIG. 8 the cloud symbol refers to the use of a network to transmit or receive data. In different embodiments, some or all of the operations described herein may be performed by components of cloud-based computing system(s) and some or all of the steps may be performed by components of local computing system(s). in different embodiments, some or all components of the architecture 800 can be installed on a local computing device, or be accessed via a cloud server. In different embodiments, the modules and databases of the environment 800 may be implemented on a single computer or may be distributed over two or more computers in a network. The modules may consist of software for execution on a single processor system or a multiple processor system. Alternatively, the modules may be a mixture of hardware and software that may be implemented over several networked computers.

In the environment 800 of FIG. 8, a 3D Print Claim Management System ("system") 850 is depicted which is in communication with an insurance policy member information database ("member database") 830, which may be part of an insurer system. The member database 830 is configured to store various types of information used to manage and process insurance claims. The information stored in the member database 830 may include account information for users of the system participating in a transaction. The user information may include information such as name, e-mail address, telephone number, network address, physical address, claim transaction records, preferred communication methods, security data, policy holder financial account information, and the like, as well as policy information, settlement history. Although not shown in FIG. 8, the insurer system can also include an insurance claim rule database that routes claim transactions as appropriate.

The system 800 is further in communication with a structural assessment system ("assessment system") 820 which is configured to receive image data from an image data collection module 810. The image data collection module 810 can represent an entry point whereby source data about a target structure may be received. In some embodiments, the source data can be optionally stored in an image storage module for later reference and/or can be linked to the insured member's account for easy retrieval, and the data is accessed from the storage. In other embodiments, the image storage module is bypassed and source data is directly inputted into the system 850.

In different embodiments, the source data itself may comprise various types of information, as discussed above. As some non-limiting examples, source data can include aerial imagery taken of various environments and structures, such as by drone, aircraft, satellite, etc. Thus, as used herein, overhead imagery includes any images that were generated from an overhead source. This may include images received from a satellite, or an aircraft. In the latter example, the aircraft may be manned or unmanned. Unmanned aircraft, also known as unmanned aerial vehicles (UAV), drones, or flying remote-controlled robots, may be equipped with various sensors, monitors, and other equipment to provide services, such as home inspection, accident response, or support during or after a catastrophic event. The use of an unmanned aircraft may provide the advantage of safer and possibly more complete data acquisition. For example, an unmanned vehicle may be maneuvered to obtain images from a perspective that would be unsafe or impractical for a human inspector to obtain. Images may also be obtained using other mechanisms, including balloons (both manned and unmanned), blimps, rockets, kites, or pole-mounted cameras, for example.

In either manned or unmanned configurations, the images received may include visual as well as non-visual information. For instance, portions of the electromagnetic spectrum may yield information about structural damage which are not discernable visually, such as measuring the light absorption of a particular roof to determine if the roof has had hail damage. Other possible risks to the insured property may be shown by ground penetrating radar, such as sinkholes in proximity to the property. The images received may be passive images or active images. One example of an active image is a radar scan of the ground or property. Furthermore, images may be obtained from a video feed received from the overhead source.

In different embodiments, the aerial-based image data is of one or more structures or other points of interest located at a target site. The target site may include various structures, such as a residence or apartment building, a shed, barn, a commercial building or any other related structures. A building typically can include a roof, room, walls, support structures, windows, or other features. In some cases, the primary structure can be associated with additional secondary structures, features, or property that may be disposed adjacent to or otherwise near the primary structure. In some embodiments, the captured image data includes telemetry data that is used to verify the location shown in the image, particularly useful in cases where the image is too occluded to even determine whether a structure is located at the site. For example, in some embodiments, the aerial image capture system can include an altitude and heading reference system (AHRS) based on which the orientation, heading, and height of the aerial vehicle and any camera can be determined. This information, when used with a GPS location for the aerial vehicle, can be used to infer the location of one or more points in an image taken from the aerial vehicle.

Furthermore, source data can include time and date information that may be displayed in an overlay in a corner of the image. In one embodiment, GPS information, for example a location or an orientation/bearing may also be included as part of the image to provide anti-fraud information. Location information may be in any of a number of forms, for example a latitude and longitude format, a city and state format, or any of a number of location granularity formats. Using data from the member database 830, the system 850 may determine if the GPS data, or other information received in the images, matches the location information for the insured property (if the policy relates to a property insurance policy). If the information does not match, the system 850 may flag the session as potentially fraudulent, causing the member service representative (MSR) to follow-up later or to place a hold on the transaction.

As a general matter, the MSR may be part of the insurance company that issued the policy for the policy holder associated with the target structure and located at the same location or a different location than the other components of the system 850. An MSR may be an agent of the entity who not only issues/maintains the policy, but also can act as an adjuster that is assigned responsibility for various loss claims. Other insurance company employees may include a physical damage specialist who may be the person who has a managerial/approving role for damage estimates and an appraiser who writes the estimate for repairing the damage. These and other insurance company employees may communicate electronically with each other and the system 100 from respective computers over wired or wireless networks using similar devices as described for the policy holders above. Although, as discussed in greater detail below, embodiments of the invention described herein work to eliminate or reduce the need for adjusters or other property damage experts to travel to assess property damage, these claims processing participants will be necessary for certain scenarios falling outside the automated scenarios described herein, in particular where claims have been identified as potentially fraudulent.

In different embodiments, source data obtained for a given structure can be received by a 3DP detection and estimation module 822 of the assessment system 820. The input is cleansed and normalized in one operation using various image processing algorithms and/or software that may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

More specifically, machine learning techniques, such as deep learning that includes classification, clustering, and/or other techniques, can be applied to the dataset to develop the model(s). Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different types of damage. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur. All of these AI systems process enormous amounts of data; for example, Caffe can process over 60 million images per day with a single NVIDIA K40 GPU.

As described earlier, the 3DP detection and estimation module 822 includes a machine learning model configured to determine or detect the presence of any 3DP-based build materials or features in the structure based on the received source data. in some embodiments, the 3DP detection and estimation module 822 can further include an image discriminator submodule (not shown) which can incorporate machine vision, image recognition, and/or related analysis to identify elements in the source data.

In some embodiments, the source data is received by an image processor that includes an image recognition processor that can, for example, apply a convolutional neural network. In another example, computer learning may be used to recognize image elements such as structures, residential components, commercial building features, environmental features, etc. In some embodiments, a knowledge repository can include information about the specific features that are relevant to the assessment system 820, such as indications of water damage, flooding, and/or downed power lines and broken structures. The image processor may use GPS data or other geolocation data to tag the image. In some embodiments, the computing device may recognize one or more positions or features in the image data, such as based on shapes, patterns, or colors of the image data and identify such via feature extraction techniques. These features may include structures on the property, risks to the structures on the property, substructures of the structures on the property (such as roof, chimneys, garages, additions, and the like), or landscaping on the property (including recreational features such as a swimming pool, fencing, and the like). These are just some examples of features on a property and is not meant to be an exhaustive list. Any discernible feature on a property that could be used to value the property, determine a risk to structures, or determine incurred damage to the property are considered to be within the scope of the present discussion. As another illustrative example, the system may recognize a feature of a residence, such as a roof, a window, or a door, for example.

In some embodiments, the processed image data and extracted features could be automatically analyzed to retrieve relevant analytic data without the need for a manual review at the assessment system 820. The 3DP detection and estimation module 822 can refer to pre-established thresholds based on the extracted features and degree of 3DP materials detected. For example, a roof may be determined to represent an entirely 3DP component if the confidence of the model is greater than 80%, a wall may be determined to represent a partial 3DP component if the confidence of the model is less than 80% but greater than 60%, while a garage door may be indeterminate with respect to its build origin if the confidence level is below 60%. In addition to a broad determination as to whether the structure includes a 3DP component, and whether the given component is entirely or partially 3DP, the model output 824 can include a classification of the brand/tradename and manufacturer associated with the given component or feature based on each image—or in some cases, a group of images of the same site and/or feature. In different embodiments, once model output 824 is generated, it may be transmitted to the member database 830 for incorporation into the associated member record and to facilitate review of the property, for example via a user interface. In some embodiments, the outcome can be presented at the dashboard and/or via a notification (e-mail, chat message, pop-up, etc.) at the computing device. In another embodiment, the system 800 and member database 830 is configured to receive the model output 824. In some embodiments, a structural assessment record 832 is generated based on the model output 824 and added or appended to the associated member record. Furthermore, in some cases the member can provide information for accessing one or more 3D print files to the insurer for one or more features of their structure, and a 3D print file 834 can be made part of the member's record. In other cases, the 3D print file 834 can be obtained directly from the manufacturer or some other third-party and made part of the member's record.

In different embodiments, when a member submits a claim 840 to the system 800, the system 800 can initiate various operations via a claims processing engine 852 to initiate processing of an insurance claim. This may include quantifying the damage and determining the maximum amount of coverage given the policy insuring the property. It may additionally include sending instructions so that a check, or other monetary device, can be issued to the insured to repair, or cover, the damage. However, as described herein, in cases where the claim 830 cites damage to a 3DP component, the claims processing engine 852 may perform or cause performance of additional operations directed towards the satisfaction of that insurance claim.

In different embodiments, the member can submit the claim 840 via software application, or a website on the Internet, which may be hosted by the system for insurance policy holders. Alternatively, insurance policy holders may make their initial contact by calling an MSR associated with the system directly by phone. After receiving valid authentication information from the insured, an electronic workfile for the claim may be automatically established by the system using information already contained in the member database 830 or other databases. The MSR will collect information from the insured to determine if further review, and an adjuster examination of the damage, is necessary. The MSR may collect basic loss information from the insured that it is automatically stored and associated with the member's account. The documents stored may be videos, photos, voice recordings, faxes and any of number of other reproducible media related to an insurance claim.

In some instances, the MSR may understand the damage reported and can assess an immediate replacement of the part based on the insured's policy without a separate adjuster review. The MSR can find the member's insurance account to see what the reimbursement limits and rules are and either prepare the estimate with a recommended payout, or in some instances cause the 3D print file to be sent to a builder to initiate replacement of the part. In these instances, time is saved and an adjuster house call can be completely avoided.

In an alternate embodiment, the system 800 can be used without initiation by the insured or a claims processing agent. One example of this is following a large weather event, such as a hail storm, tornado, or hurricane. The system 800 could choose to dispatch an image collection device (e.g., via image collection module 810) to the affected area and preliminarily determine damage to insured properties in that area. Claims processing agents can then begin to contact the insured and work with them to resolve the potential insurance claim.

In different embodiments, the claims processing engine 852 for system 800 can receive the structural assessment 832 (or model output 824), and—in response to an associated claim for a 3DP structure—direct the information to a fraud detection module 860. The fraud detection module 860 can compare, via a match determination module 864, the claimed information and the information obtained based on the model output 824. For example, if member claim 840 includes a claim for damage to a 3DP garage door, and the broad structural assessment for the member's property indicates a low to no likelihood of a 3DP element being present on the property, a fraud notification and follow-up command may be generated and/or the claim or aspects thereof can be classified as potentially fraudulent. Similarly, if member claim 840 includes a claim for damage to a 3DP garage door, and a more detailed structural assessment for the member's property indicates a portion was 3DP (e.g., the roof) but the garage door has a low to no likelihood of representing a 3DP element, a fraud notification and follow-up command may be generated and/or the claim or aspects thereof can be classified as potentially fraudulent. In some embodiments, the follow-up can involve a manual survey or adjuster visit of the structure, a request for documentation supporting the 3DP origins of the damaged part, or a request for a more detailed set of image data for the structure to provide as input for the model. On the other hand, if member claim 840 includes a claim for damage to a 3DP garage door, and the broad assessment indicates there was a 3DP element and/or in a more detailed assessment that the garage has a high likelihood of representing a 3DP element, the match determination module 864 can generate a positive output and a verified classification that allows the claim to move forward, or a notification that indicates a consistency between the claim and the assessment.

If the claim is verified by the fraud detection module 860, or if the claim is otherwise verified outside of the fraud detection module 860, the information about the 3D part generated using the structural assessment system 820 can be used to expedite the recovery process for the damage cited in the member claim 840. As will be discussed in greater detail below, in some embodiments, the system 800 includes a claim redirect module 870. In different embodiments, the claim redirect module 870 is configured to access warranty coverage 874 associated with the identified 3DP element(s) via a 3D supplier database 870. The 3DP supplier database 870 can be maintained as part of system 800 and accessed internally, and/or be a third-party system. The 3D supplier database 870 can include up-to-date records of 3DP manufacturers, suppliers, builders, etc., as well as store warranty information for each 3DP mixture and cross-reference such information by brand/tradename, manufacturer, geographic regions where this mixture is commonly used, builders or suppliers who commonly use this mixture, etc.

As a general matter, contractual warranties assure the purchaser of the product that assure that 1) the materials and equipment furnished will be of good quality and new unless otherwise required, 2) the work will be free from defects not inherent in the quality required or permitted, and 3) work will conform with the requirements of the contract documents (e.g., see AIA Document A201). In addition, if the part is designated for use in residential construction, there are typically statutory warranties that will be available for the product. As a non-limiting example, in the U.S. state of Minnesota, Minn. Stat. § 327A provides certain statutory warranties for homeowners. For goods sold by commercial suppliers or manufacturers, the Uniform Commercial Code's ("U.C.C.") warranties are applicable. These include warranties of fitness for a particular purpose and merchantability, and, if provided, other express warranties. Similarly, parties to a construction contract utilize indemnity for allocating liability. Construction contracts contain indemnification provisions and flow-down clauses which funnel liability down the contractual chain. In the absence of such clauses, the common law will often still allow recovery if one is forced to pay for the mistakes of another. These warranty and indemnity concepts can be applied to 3D printing, though the specific terms of the warranty can vary based on the particular 3DP technology and building method used. If the component pieces are printed off-site and sold to the owner, it is expected that there would be little difference between 3D printing and any other form of manufacturing with respect to warranty coverage. The printed component will arrive and be incorporated into the structure, just as any other manufactured component. If the component fails, the owner (or insurer) would be able to recover from the manufacturer based on the U.C.C. warranties (building components are generally "goods" covered by the U.C.C.) or its indemnity agreement. In addition, there may be the manufacturer's express warranties or express indemnity agreement given the novelty of the 3DP manufacturing process, but as a general matter, the incorporation of the component into the whole project will be similar to a component manufactured in a more traditional manner. In different embodiments, the 3D supplier database 872 can include information related to these types of warranties.

Similarly, if the 3D printer is used on a much larger scale on the job site, for example during the printing of the structural portions of a house with one large machine, similar legal protections should apply and will be stored as part of the warranty coverage 874 in the 3D supplier database 874. In effect, the contractor will be using one large piece of construction equipment to complete a large portion of the project instead of smaller pieces of equipment and labor. While this is a large technological shift, the legal concepts undergirding allocation of liability still apply, and subrogation remains a viable option for recovery. The contractor is still providing services, namely constructing the building, and the same common law, contractual, and statutory warranties and indemnity provisions may be applied. The proposed system ensures that, even with such a new technology, every printed part will perform as advertised or an automated request for a replacement printed part will be generated.

Once the warranty information has been accessed or otherwise obtained, it can be shared with a subrogation module 876 of the claim redirect module 870, which is configured to determine whether the present claim details lie within the scope of the warranty information. In other words, the subrogation module 876 can identify the cause of damage (e.g., hurricane or other storm, flooding, hail, fire, earthquake, or other natural disaster) and the severity of that cause (e.g., a category 4 hurricane, a level 2 fire, an earthquake of 4.5 on the Richter scale, etc.) and in the context of the terms of the warranty for the 3DP mixture determine whether a subrogation process is applicable. In other words, if the part failed to perform per the manufacturer specifications, the claim management system 800 can directly contact the manufacturer for a replacement of the part. Thus, in some embodiments, if subrogation is deemed to apply to the given claim scenario, the system 800 can automatically generate claim data and access the associated 3D print file 834 for the structure via a replacement request module 878. This information will be transmitted directly to the manufacturer of the part by the claim redirect module 870, with a request for the manufacturer to print the damaged part.

For purposes of clarity to the reader, as a non-limiting example, if the member claim 840 includes damage to their residence, and the wall included some portion of "Acorn's Buildstream" concrete mixture that was warrantied to withhold a wind of up to 100 mph (or fire of a specific intensity, etc.), the wall should have not damaged at 95 mph winds because it was within the tolerance limit. However, if aerial imagery or the member claim information indicates the wall is nevertheless damaged, the system would determine this corresponds to 'break' in the specifications or the product warranty that Acorn has provided (triggering the subrogation). In response, the system would automatically direct the 3D print request to the designated company (e.g., Acorn), with a description of the part and/or the print file for the part, with the expectation that Acorn would initiate printing of the part(s). For example, the system 800 can generate a work order that includes the property information (e.g., address, zip code, date of construction, stated warranty) and requests fulfillment of the company's obligation to re-print the part that was damaged. However, if the wind was above 100 mph (outside the warrantied tolerance), the subrogation module 876 would instead determine that subrogation is inapplicable, and no such request would be sent to the manufacturer.

As noted earlier, if the claim is verified by the fraud detection module 860, or if the claim is otherwise verified outside of the fraud detection module 860, the information about the 3D part generated using the structural assessment system 820 can be used to expedite the recovery process for the damage cited in the member claim 840. As will be discussed in greater detail below, in some embodiments, the system 800 includes a 3DP component recovery module 880, which can operate in parallel to or as an alternative to the claim redirect module 870. The 3DP component recovery module 880 is configured to receive a verified claim for damage to a 3DP part and in response identify a service provider (with whom the insurer has a preexisting relationship) for 3D print jobs in or near the region in which the member's insured property is located via access to a service partner database 884. Once a service partner is identified, an initial communication may occur in which the system 800 confirms whether the selected service partner has the capacity and materials to produce the requested part. If the service partner can accept and/or perform the job within the desired timeframe, a print submission including the 3D print file for the part will be transmitted to the service partner via a print submission processor 882, and a formal work request based on the member claim 840 is generated to accompany the file. An automated exchange between the 3DP component recovery module 880 and the service partner can occur in which the service provider confirms their acceptance of the job, and updates the system regarding the expected completion date of the printing of the part.

In some embodiments, once a part has been scheduled for printing and the system has received confirmation of such, a contractor scheduler module that is part of a marketplace server 886 of the 3DP component recovery module 880 can be triggered, as discussed below in FIG. 14. The contractor scheduler module is configured to provide a bridge between a licensed contractor in the same area and the insured member, and automate the process of transportation and installation of the printed part from the service partner.

Figure 9:
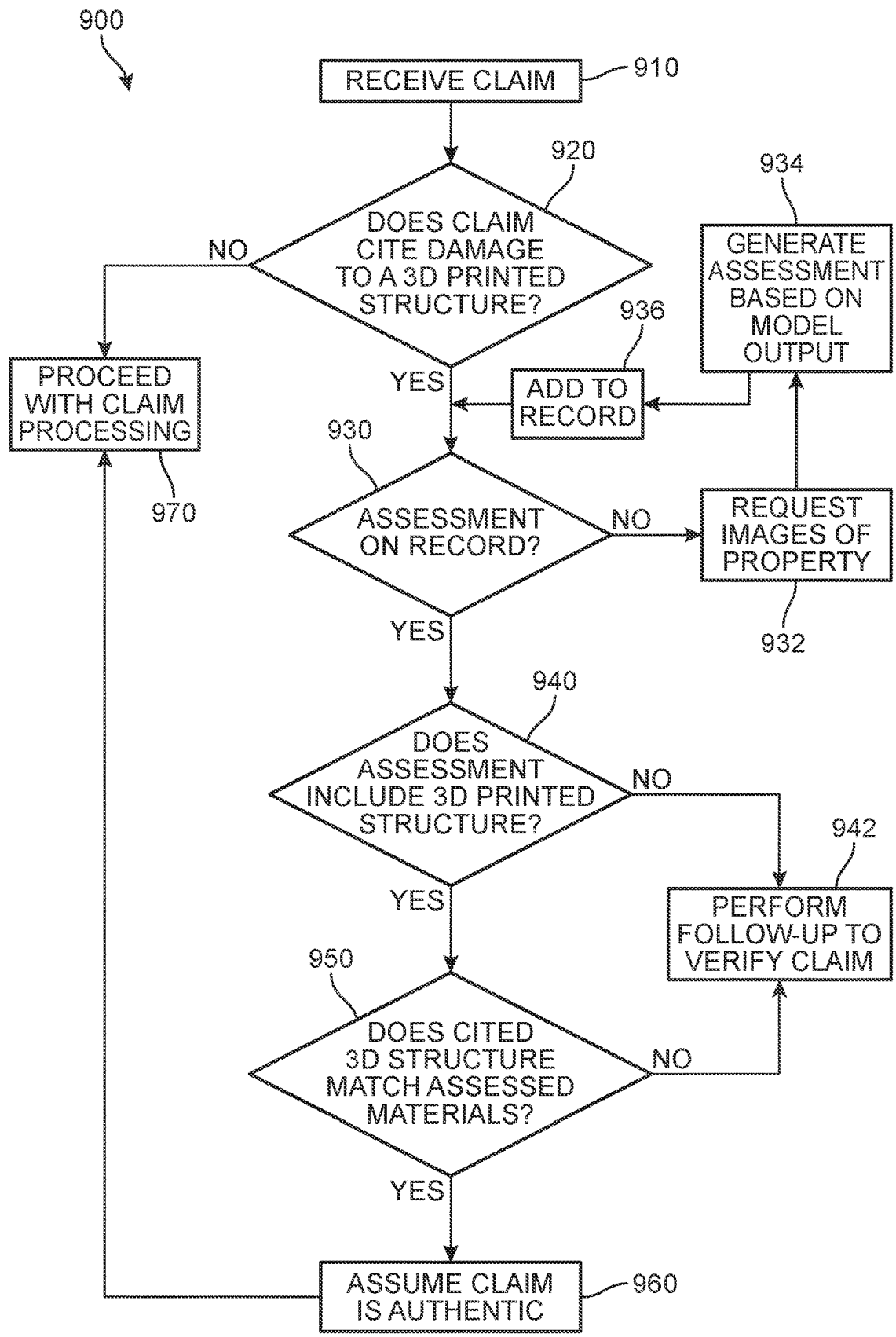
FIG. 9 is a flow diagram depicting a 3DP verification process, according to an embodiment.
Figure 10:
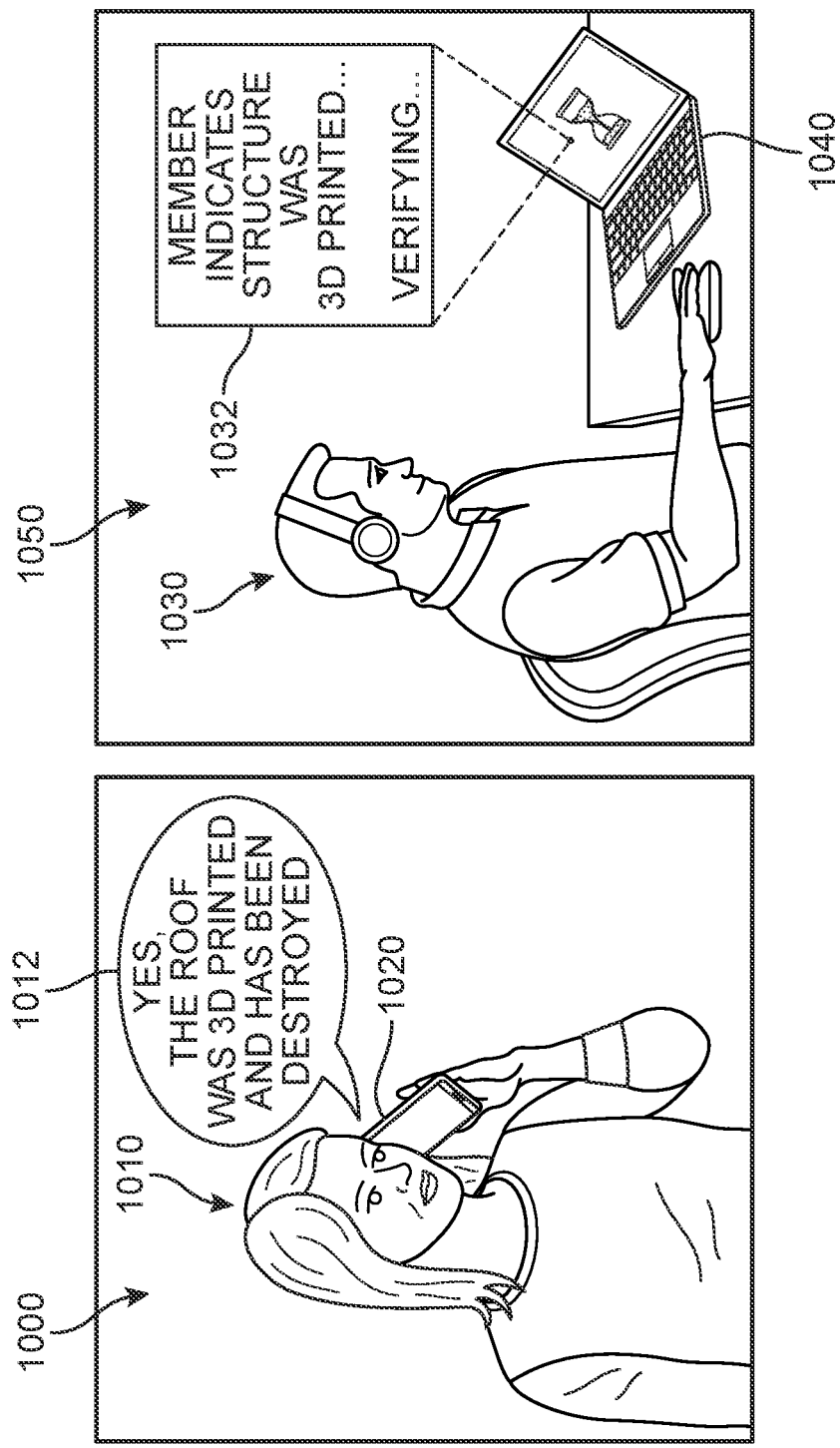
FIGS. 10 and 11 illustrate an example of a fraud notification scenario involving the 3DP verification process, according to an embodiment.
Figure 11:
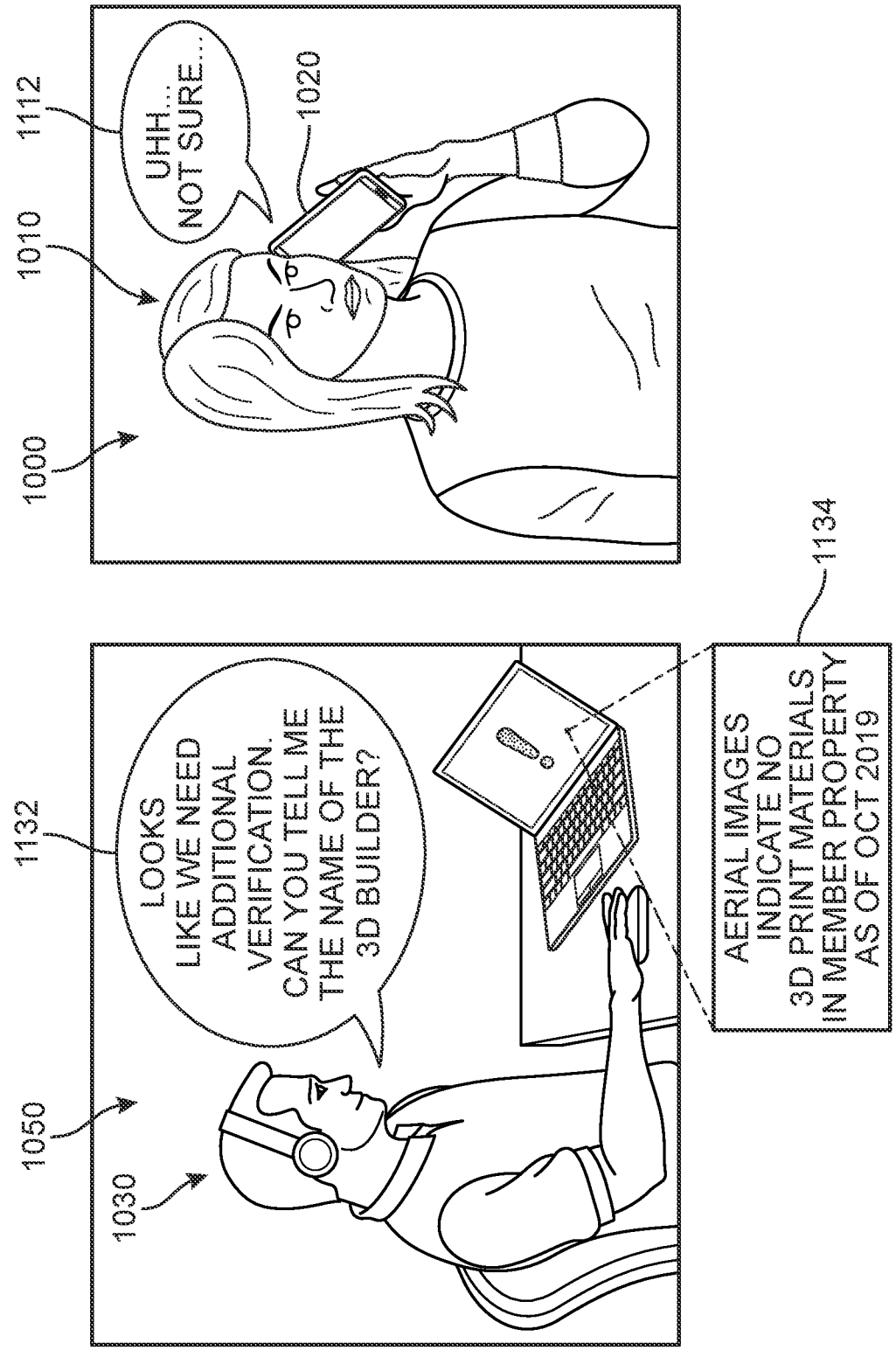

Additional details regarding embodiments of the fraud detection module and its associated operations are now provided with reference to FIGS. 9-11. In FIG. 9, a schematic flow diagram presents an overview of a 3DP verification process 900 that may be automatically implemented by the proposed systems. In a first stage 910, a claim or other information is obtained by the system that relates to damage to a structure. A second stage 920 involves determining whether the damage is purportedly directed to or involving a 3DP structure. If no 3DP structure or component thereof is involved, the verification process 900 can be abbreviated and the system can direct or permit the claim to advance for further processing by another module or system in a final stage 970. On the other hand, if there is an indication that a 3DP structure is associated with the claim, the system can determine, in a third stage 930, whether the member record linked to the damaged structure already has a structural assessment available. If an assessment has already been provided for the structure, the verification process 900 can move to a fourth stage 940. If, however, there is no assessment, the system can be configured to automatically trigger a request to the image collection service to obtain image data of the property in a first assessment step 932. The image data can be passed through the model and a structural assessment generated in a second assessment step 934, and the structural assessment added to the member record in a third assessment step 936.

During the fourth stage 940, the system determines-based at least on the information in the structural assessment-whether the structure is or includes 3DP elements. If there is a low likelihood of the structure having 3DP elements, the system can be configured to automatically classify the claim as potentially fraudulent, and require a follow-up verification be performed in a follow-up process 942. If there is a high likelihood of 3DP elements in the structure, the system can optionally add another level of verification to the verification process 900 by attempting to determine if the damaged structure that is being cited as being 3DP matches the portion of the structure that was identified by the structural assessment as being 3DP in a fifth stage 950. In this optional embodiment, if there is no such correspondence, the system can trigger the follow-up process 942. If there is a correspondence (or the fifth stage 950 is not performed), the system can classify the claim as authentic, at least with respect to the presence of 3DP, in a sixth stage 960, and move to the final stage 970 whereby the claim is permitted to advance for further processing by another module or system.

FIGS. 10 and 11 illustrate an example of a 3DP claim verification process that may occur using some of the proposed systems. In this case, a first member 1010 at a first location 1000 is engaged in a communication session with a first service agent ("first agent") 1030 who is located in a remote location relative to first member 1010, such as a call center 1050. The first member 310 is speaking to the first agent 1030 via a telephone 1020 (shown as a smart mobile device), and the first agent 1030 is responding over a computer-based telephony system 1040 that includes or otherwise has access to an embodiment of a claim management system (e.g., see FIG. 8). In other embodiments, the communication can occur in part or fully via a video conferencing interface whereby the first agent 1030 and first member 1010 speak in real-time over two computing devices.

In FIG. 10, the first member 1010 indicates to the first agent 1030 that the damaged portion she is reporting involved 3DP in a first utterance 312 ("Yes, the roof was 3D printed and has been destroyed"). Unfortunately, as noted earlier, some persons may claim damage for features that were never part of their home or other building, making such claims fraudulent. As shown in FIG. 10, embodiments of the proposed system can be configured to initiate a verification based on the structural assessment associated with the given structure, represented here by a first system message 332 ("Member indicates structure was 3D printed . . . Verifying . . . "). For example, the system may access the structural assessment via a link in the member's record or pertinent details of the assessment may be stored directly in the member's record.

In FIG. 11, it can be seen that the system has determined the structure has no 3DP components via second system message 1134 ("Aerial images indicate no 3D print materials in member property as of October 2019"). In other words, the system alerts the first agent 1030 that there is a high likelihood that the first member 1010 has lied or otherwise has submitted false information about her structure and/or has an unsubstantiated belief that must be corroborated. implemented a spoofing technique to disguise her true location. In other words, the system notifies the first agent 1030 of a recognition of a case of potential fraud. Upon presentation of this result, the first agent 1030 can be more cautious in how they proceed.

While in some cases the first agent 1030 can simply end the communication session or make a note in the system, in other cases, the first agent 1030 can proceed by either collecting more information to follow-up on the verification process. In this case, the (imposter) first member 1010 may be understood to be attempting to recover a component for her house that is of greater value than the original roof, and was not expecting that any other information would be requested. In FIG. 11, the first agent 1130 offers a second utterance 1132 ("Looks like we need additional verification. Can you tell me the name of the 3D builder?"), and holding off on further processing of the claim until the caller can successfully respond to the question, which takes the first member 1010 by surprise, as indicated by a third utterance 1112 ("Uhhh . . . Not sure . . . "). The first agent 1030 can then ask another, alternate question that can help them verify the claim, or seek another type of verification, or simply end the session. Thus, the system has thwarted an attempt by a member to 'scam' the insurer into paying for a higher-value component.

Figure 12:
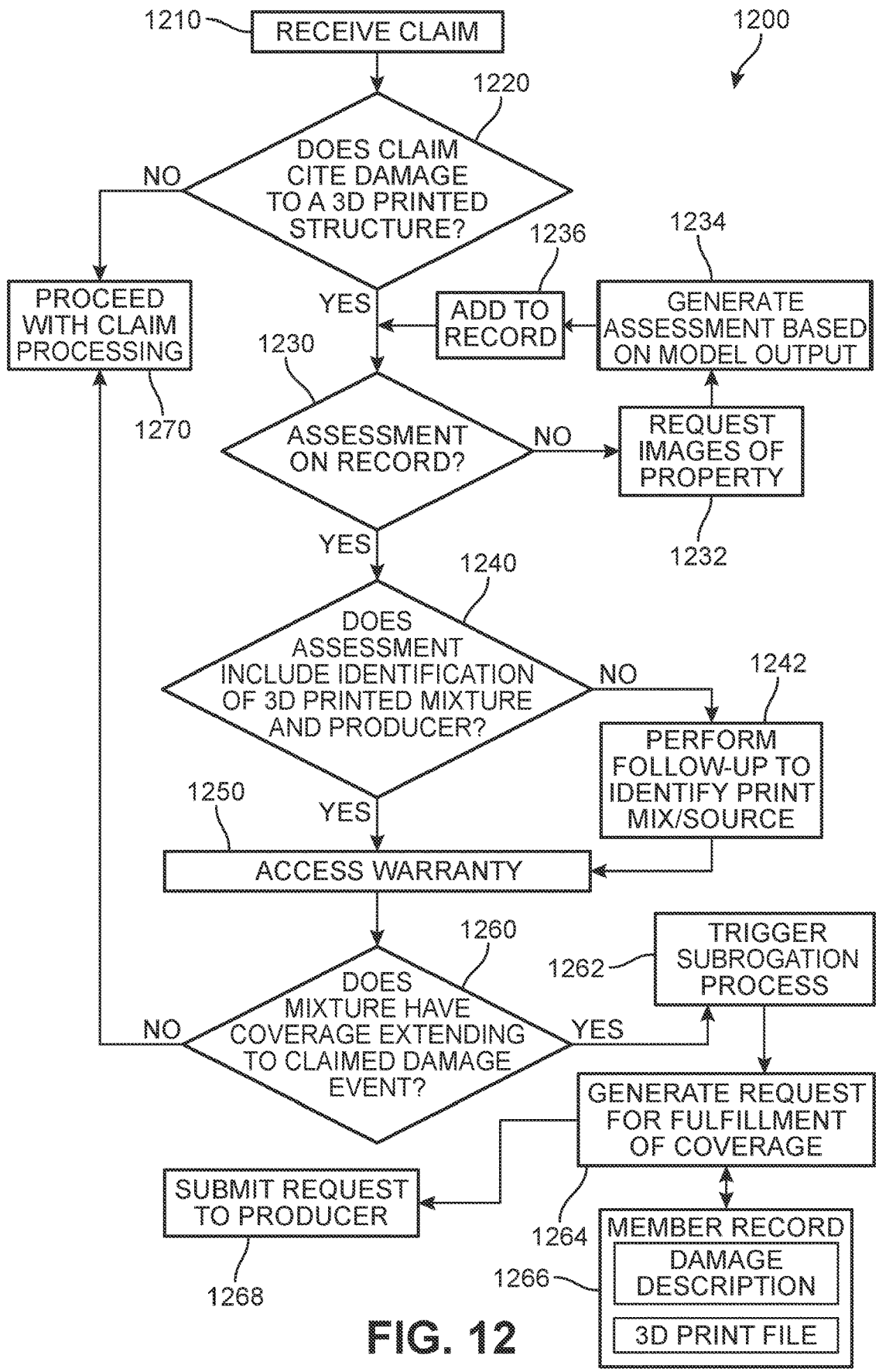
FIG. 12 is a flow diagram depicting a 3DP subrogation process, according to an embodiment.

Additional details regarding embodiments of the claim redirect module and its associated operations are now provided with reference to FIG. 12. In FIG. 12 a schematic flow diagram presents an overview of a 3DP subrogation process 1200 that may be automatically implemented by the proposed systems. In a first stage 1210, claim or other information is obtained by the system that relates to damage to a structure. A second stage 1220 involves determining whether the damage is purportedly directed to or involving a 3DP structure. If no 3DP structure or component thereof is involved, the subrogation process 1200 can be abbreviated and the system can route direct the claim for further processing in a final stage 1270. On the other hand, if there is an indication that a 3DP structure is associated with the claim, the system can determine, in a third stage 1230, whether the member record linked to the damaged structure already has a structural assessment available. If an assessment has already been provided for the structure, the subrogation process 1200 can move to a fourth stage 1240. If, however, there is no assessment, the system can be configured to automatically trigger a request to the image collection service to obtain image data of the property in a first assessment step 1232. The image data can be passed through the model and a structural assessment generated in a second assessment step 1234, and the structural assessment added to the member record in a third assessment step 1236.

During the fourth stage 1240, the system determines-based at least on the information in the structural assessment-whether the assessment includes an identification or classification of a 3DP mixture and/or 3DP manufacturer/supplier/producer. If the assessment does not include this information, or the classification is associated with a confidence level lower than a preselected threshold, the system can be configured to trigger a follow-up assessment (step 1242) that causes a performance of a more detailed review of the structure to identify the print mixture and/or source. Once that information is obtained, or if the information is available in the structural assessment, the system can access a 3D supplier database (see FIG. 8) in a fifth stage 1250, which includes data associated with common manufacturers, suppliers, builders, producers, contractors, etc. who work with 3DP materials, their contact information, and the related technical specifications and warranty coverage for the materials. In a sixth stage 1260, the system can determine if the mixture is associated with some type of coverage that extends to the claimed damage event, as discussed earlier. If there is no such coverage (e.g., the wind speed of the storm exceeded the capacity described in the specification for the product to withstand), the system can redirect the claim to the final stage 970 whereby the claim is permitted to advance for further processing by another module or system.

However, if the system determines the damage should be covered by the warranty for the product, a subrogation process can be triggered in a seventh stage 1262. This causes the system to automatically generate a request in which details of the damaged part are incorporated, why the damage is covered, along with a description of the damage-causing event, as well as (where available) a copy of the 3D print file for the component that is to be replaced. This information is generated by the system's access to, for example, member record 1266, or from the claim itself. The system can then transmit the request and file to the manufacturer based on the data provided by the warranty database in an eighth stage 1268. In other words, rather than simply determining the amount of damage, the amount of coverage, and issuing a check to the member for the repair of the damage up to the covered amount, the insurer can enable the member to be fully restored by the one-on-one replacement of their printed parts through a direct communication with the manufacturer that does not require the member to engage in tedious requests for parts or changes in the component's price that may have occurred. The transmission of the request to the manufacturer may be done without agent interaction, and solely by automated systems. However, it may also be done with agent interaction, or with some combination based on the amount of damage.

Figure 13A:
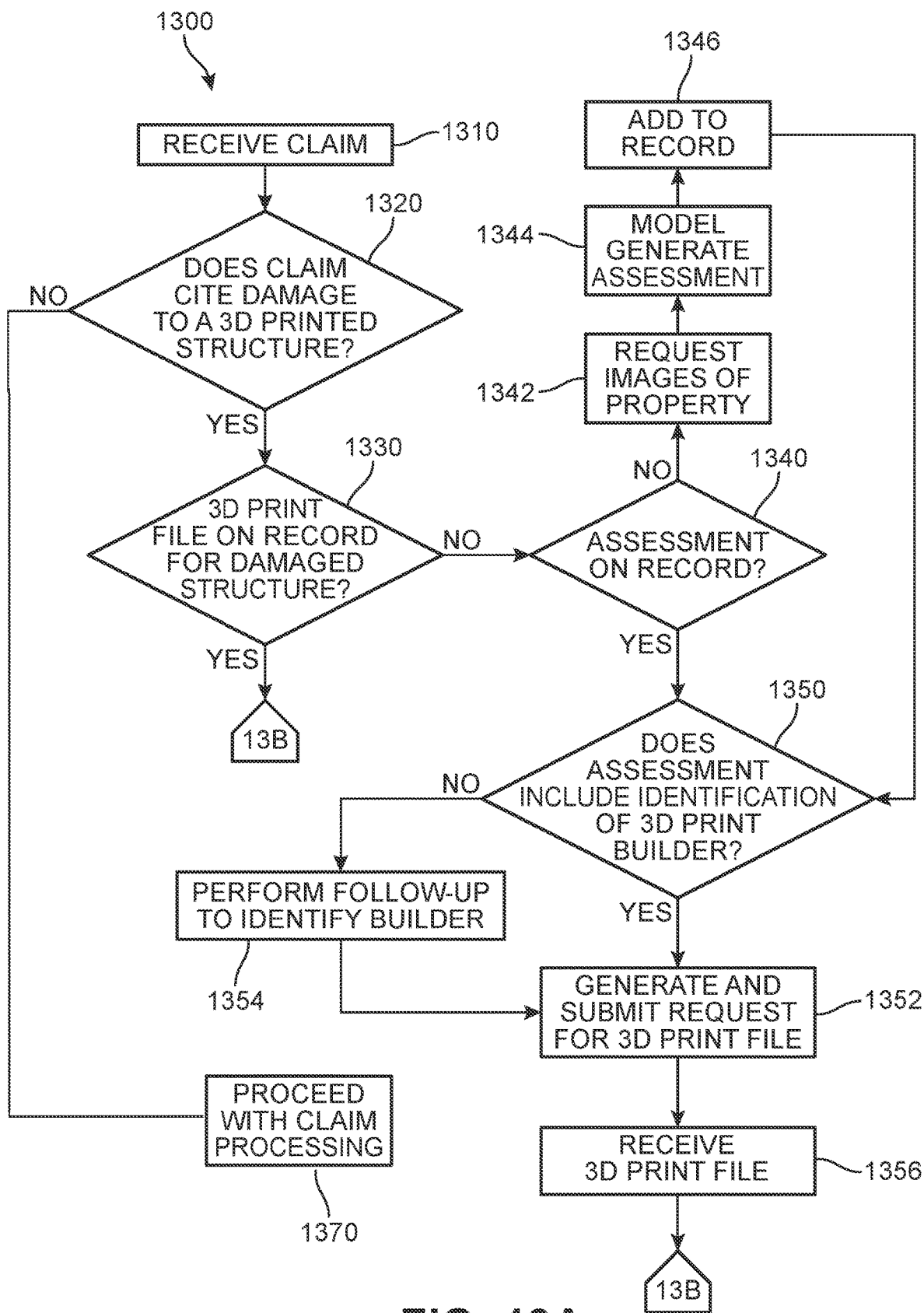
FIGS. 13A and 13B together are a flow diagram depicting a 3DP component recovery process 1300, according to an embodiment.
Figure 13B:
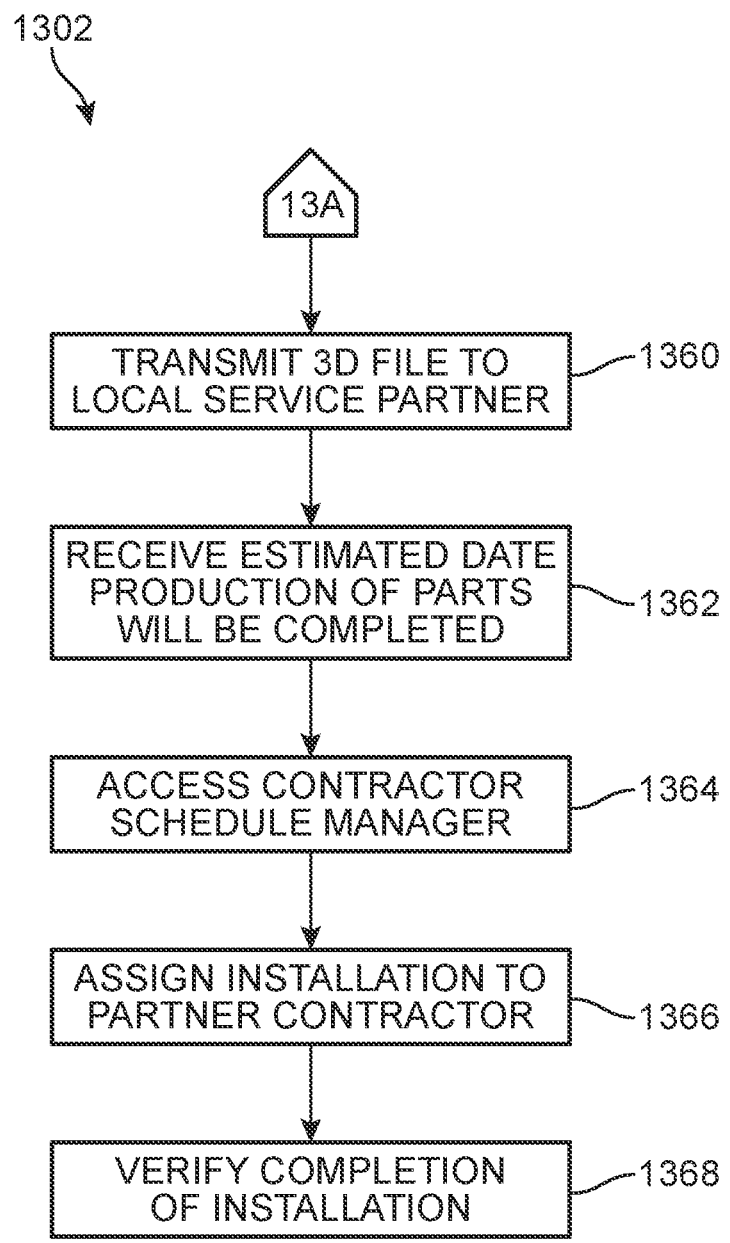

Additional details regarding embodiments of the 3DP component recovery module and its associated operations are now provided with reference to FIGS. 13A and 13B. FIGS. 13A and 13B collectively show a schematic flow diagram of an overview of a 3DP component recovery process (1300, 1302) that may be automatically implemented by the proposed systems. In FIG. 13A, at a first stage 1310, claim or other information is obtained by the system that relates to damage to a structure. A second stage 1320 involves determining whether the damage is purportedly directed to or involving a 3DP structure. If no 3DP structure or component thereof is involved, the recovery process can be abbreviated and the system can route direct the claim for further processing in a final stage 1370. On the other hand, if there is an indication that a 3DP structure is associated with the claim, the system can determine, in a third stage 1330, whether the member record linked to the damaged structure already includes or is associated with a 3DP file. If the file is available, the recovery process can move to a subsequent stage in FIG. 13B. If no 3DP file is available, the system can determine if the member record includes a structural assessment in a fourth stage 1340. If an assessment has already been provided for the structure, the recovery process can move to a fifth stage 1350. If, however, there is no assessment, the system can be configured to automatically trigger a request to the image collection service to obtain image data of the property in a first assessment step 1342. The image data can be passed through the model and a structural assessment generated in a second assessment step 1344, and the structural assessment added to the member record in a third assessment step 1346.

During the fifth stage 1350, the system determines-based at least on the information in the structural assessment-whether the assessment includes an identification or classification of a 3DP manufacturer/supplier/producer. If the assessment does not include this information, or the classification is associated with a confidence level lower than a preselected threshold, the system can be configured to trigger a follow-up assessment (step 1354) that causes a performance of a more detailed review of the structure to identify the print mixture and source. Once that information is obtained, or if the information is available in the structural assessment, the system can automatically generate a request for the 3DP file for the damage component and transmit said request to the identified entity in a sixth stage 1352. In some embodiments, the request can be transmitted based on contact data in the 3D supplier database (see FIG. 8) which includes data associated with common manufacturers, suppliers, builders, producers, contractors, etc. who work with 3DP materials, their contact information, and other pertinent information. In a seventh stage 1356, the system can receive the 3DP file.

Moving to FIG. 13B, in an eighth stage 1360, the 3DP file is transmitted to a local service partner. This stage can involve a selection of the service partner nearest (geographically) from the damaged structure, for ease of delivery. In addition, the selection can be based on the service partner's ongoing arrangement with the insurer on how components will be manufactured on-site, the partner's schedule and timeline for completion, the current pricing and market for the service, and the proximity of the service partner to local trusted contractors who can perform the installation. Once the service partner receives the 3DP file, the system can confirm receipt and receive information indicating the expected completion timeline in a ninth stage 1362. This information can optionally be shared with the insured member.

In some embodiments, the system can further implement or interact with a contractor schedule manager in a tenth stage 1364, as will be discussed in greater detail in FIG. 14. The system can then assign the installation of the printed component to a partner licensed contractor in an eleventh stage 1366. The contractor can accept the component at the site of the service partner's printer on behalf of the insurer, and transport the component to the property of the insured structure. The contractor can perform installation and the system receives a confirmation of these actions in a twelfth stage 1368. In other words, rather than simply determining the amount of damage, the amount of coverage, and issuing a check to the member for the repair of the damage up to the covered amount, the insurer can enable the member to be fully restored by the one-on-one replacement of their printed parts through a direct communication with a local service partner that does not require the member to engage in tedious requests for parts or changes in the component's price that may have occurred. The transmission of the request to the manufacturer may be done without agent interaction, and solely by automated systems. However, it may also be done with agent interaction, or with some combination based on the amount of damage.

In different embodiments, the 3DP files referred to herein can be representative of any file format commonly used by 3DP manufacturers and builders. For example, the file can include proprietary file formats such as Maya, Blender, XSI, MeshLab, 3D Studio Max u Rhinoceros 3D, Cinema 4D, Modo, Browzwear, Autodesk 3DS Max, Cheetah3D, and IMSI TurboCAD Deluxeetc., MotionBuilder, Cinema4D, Rhino, Modo, Maple, FreeCAD, MeshLab, OpenSCAD, SketchUp, SolidWorks, Solid Edge, ds Max (ColladaMax), Cinema 4D (MAXON), Blender, MeshLab, Poser Pro, Maya (ColladaMaya), Shade 3D, LightWave 3D, SketchUp, PTC, Dassault Systèmes, Netfabb, SLM, HP, Microsoft, Materialize, Shapeways, 3D Systems, Fusion 360, CATIA, ArchiCAD, OnShape, PTC Creo, TurboCAD, Siemens PLM Tools, Stratasys, and Mudbox, as well as nonproprietary neutral (or open-source) 3D file formats such as .FBX, .3DS, .OBJ, .MTL, .STL, .IGES, Collada, 3MF, .STP, etc.

Figure 14:
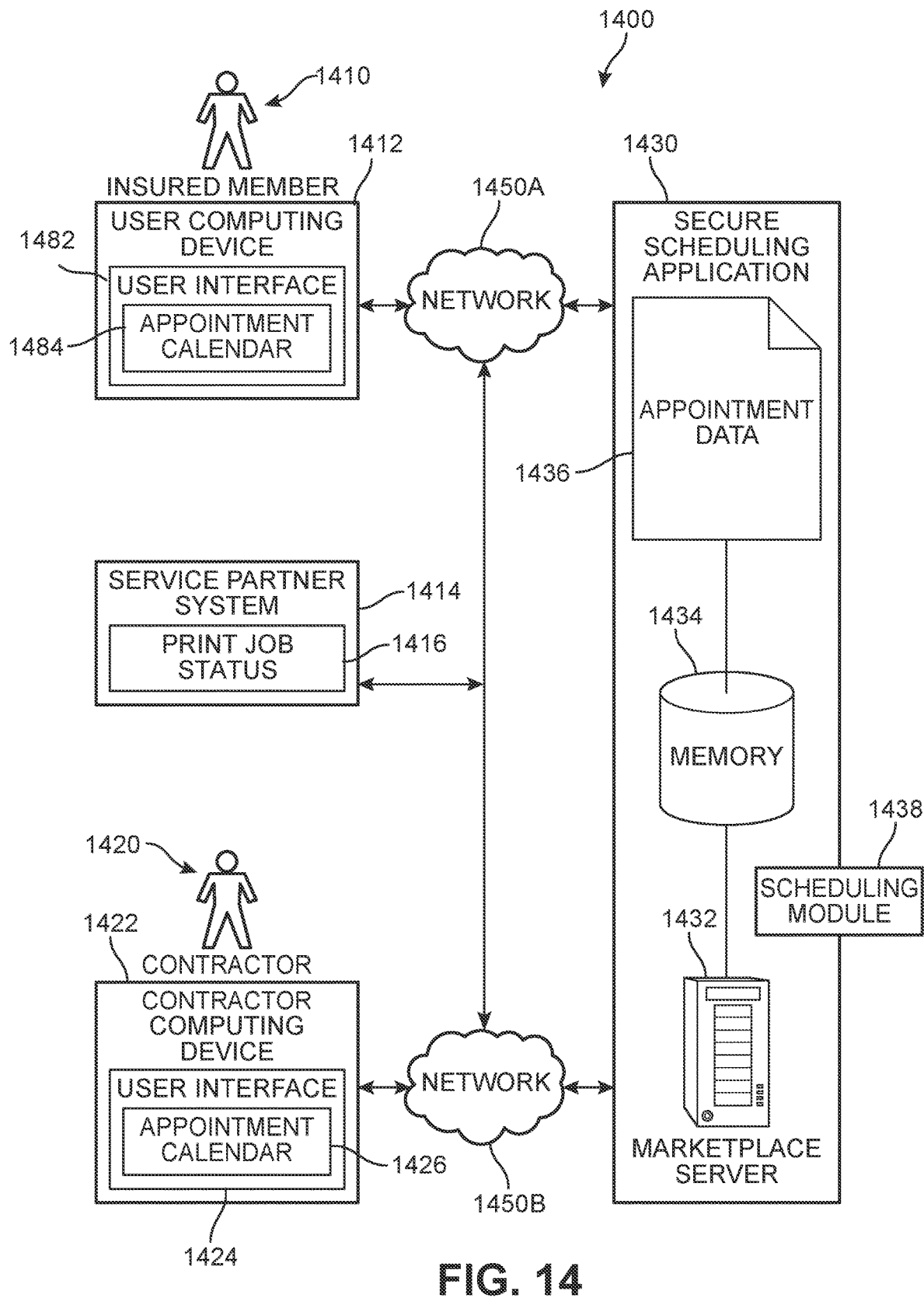
FIG. 14 is an example of a schematic framework for enabling various end-users and parties to schedule and manage the manufacture, delivery, and installation of the replacement 3DP component.

Referring now to FIG. 14, an embodiment of a scheduling manager environment 1400 for use with the recovery module described herein is depicted. As a general matter, some or all of the described functionality can be implemented in software and/or hardware on user computing device 1412 for insured member 1410, contractor computing device 1422 for contractor 1420, a service partner computing system 1414, or remote marketplace server 1432 associated with a secure scheduling application ("app") 1430. Computing devices can include, but are not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general-purpose computing device in the form of a computer including a processing unit, a system memory, and a system bus that couples various system components including the system memory to the processing unit. Additionally, or alternatively, some or all of the functionality can be performed remotely, in the cloud, or via software-as-a-service. The remote functionality can execute on server class computers that have sufficient memory, data storage, and processing power and that run a server class operating system (e.g., Oracle® Solaris®, GNU/Linux®, and the Microsoft® Windows® family of operating systems, or other such systems).

In different embodiments, the computing devices provide or enable access to a web browser, native application, or both, that facilitates execution of the functionality described herein. A web browser allows the device to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Non-limiting examples of commercially available web browser software include Microsoft® Internet Explorer®, Mozilla® Firefox®, and Apple® Safari®.

Furthermore, the computing devices can include client software. The client software provides functionality to the device that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

FIG. 14 depicts an environment in which the insured member 1410 can interact with the events performed by the service partner and the contractor 1422 as supported by the marketplace server 1432 of the recovery module. For example, as the process of component recovery (described in FIGS. 13A and 13B above, and also in FIG. 15 below) is initiated by the system, the service partner system 1414 can generate print job status data 1416 that is shared with the app 1430 via network (1450A, 1450B) and shared with a scheduling module 1438. The insured member 1410 can interact with app 1430 to initiate a secure appointment process. In different embodiments, app 1430 is configured to enable consumers to request appointments, goods, or services using the marketplace server 1432. In other words, the marketplace server 1432 can connect consumers such as insured member 1410 with the contractor(s) and other professionals (merchants) to buy and sell consumer services. An internet cloud-based hardware server(s) can offer a marketplace environment for the sourcing and marketing, sale and acquisition, delivery and acceptance, payment, feedback, and electronic digital archiving of consumer services. In addition, the marketplace can be integrated with scheduling module 1438 where individual consumer's calendars are also maintained and timeline (completion dates for projects) information is received. The scheduling module 1438 can also be used by contractors and other service professionals via business user interface 1424 to maintain complete operating schedules for all productive assets used to generate their service income. In some embodiments, the app 1430 includes scheduling module 1438, while in other embodiments the scheduling module 1438 is externally accessed by app 1430.

In some embodiments, the task of component pick-up from the service partner location, delivery of the component to the insured member's property, and/or installation of the component at the structure can be listed as available jobs at the marketplace server 1432, for viewing by authorized contractors and agents via the app 1430. For example, a contractor 1422 may log-in to the app 1430 and find a job they would like to perform involving a 3DP component printed by a local service partner for at the request of the insurer. The contractor 1422 (who has been pre-approved and authorized by the insurer to interact with the app) can then place a bid or otherwise submit a request to be considered for the task, which the app 1430 can review and accept or decline. In some embodiments, the contractor 1422 can update his availability on the appointment calendar 1426 for performing the task as part of his/her request. The insured member 1412 may make a final selection between multiple contractor submissions based on their availability matching their own needs and schedules.

In some embodiments, the contractor 1420 can access their appointment data via business user interface 1424. In other embodiments, the contractor 1420 can integrate or embed a secure scheduling component at their own merchant website to enable the same secure appointment functionality outside the marketplace server 1432. Thus, in some embodiments, marketplace server 1432 is optional, and the proposed systems can be implemented as a cloud-service connecting the user computing device 1412 and contractor computing device 1422. In different embodiments, the scheduling module 1438 (whether as part of app 1430 or as a separate component) can be configured to provide fully automated, real-time scheduling, including receiving a scheduling and verification request, scheduling the service, confirming the appointment, sending appointment reminders in various formats, and sending requirements notifications and reminders.

In different embodiments, insured member 1410 schedules an appointment through a member user interface 1482 associated with the app 1430, where scheduling module 1438 is configured to communicate with a contractor/service partner appointment calendar 1426 to create the appointment, stored in memory 1434 as appointment data 1436. The appointment will be based on a time after the estimated completion date of the component by the service partner system 1414. In different embodiments, appointment data 1436 includes one or more of merchant schedules and consumer schedules, and can store newly created, pending, and past appointment actions (history). Thus, the insured member 1412 can select an available time and a contractor—as inputted by the contractor 1420—for having the contractor 1420 pick up the component at the service partner location, bringing the printed component to the structure location, and performing installation. In some embodiments, the contractor 1420 can refer to multiple persons (e.g., transporter, delivery agent, builder, plumber, roofer, etc.) depending on the type of component being installed. In other words, the process of manufacture of the replacement 3DP part, delivery, and installation can all be automatically managed in response to each party's response to the system as made available through app 1430.

Figure 15:
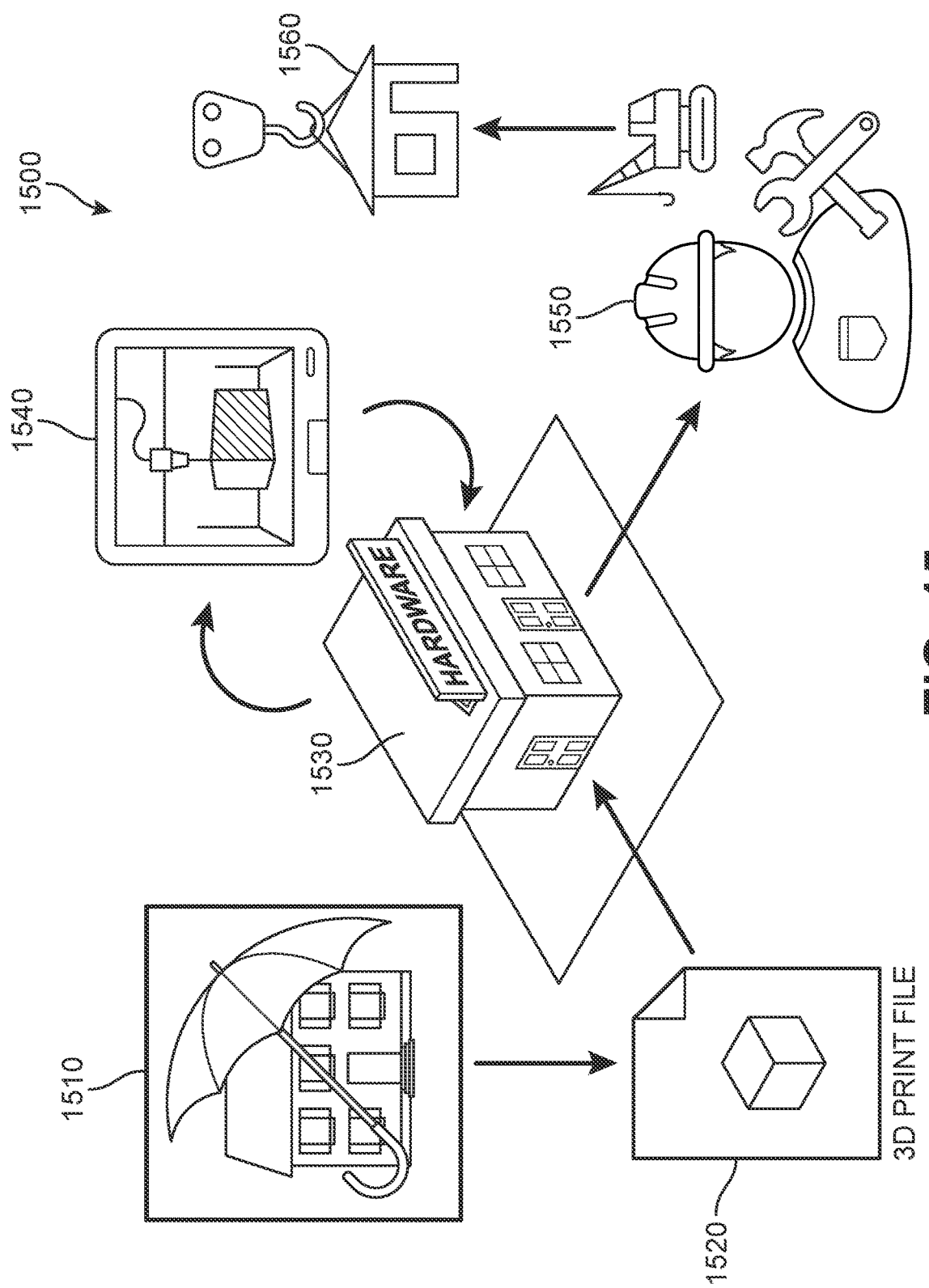
FIG. 15 is a high-level overview of a 3DP component recovery process, according to an embodiment.

For purposes of illustration, an example of the process described in FIGS. 13A, 13B, and 14 is now depicted schematically in FIG. 15. In a first stage 1510, the member structure, which is covered by some form of insurance or other protection, is damaged, and the information for the damage is received by the system. In association with this information, a 3DP file that includes a model of the damaged component can be retrieved, obtained, requested and received, etc. by the system in a second stage 1520. The system then transmits the 3DP file to a trusted local service partner that has been selected from access to a verified service partner directory (with whom the insurer has pre-established relationships) in a third stage 1530, which confirms receipt of the file to the system, and generates an estimated completion date. The part will be printed by the service partner in a fourth stage 1540 per their schedule and material supply. The system adds this information to the scheduling module, which allows contractors to place bids and/or otherwise request the opportunity for assignment to the task of picking up the printed part and delivering to the property and/or installation. The contractor can also indicate his/her availability as appointment data, which can be viewed by the insured member. The insured member can then make a selection based on his/her convenience. The contractor who is selected can receive authorization by the system—which can be accessed via the app—that when presented to the service partner permits the release of the printed component to the contractor in a fifth stage 1550. The contractor can pick up and deliver the component, as well as perform installation, in a sixth stage 1560.

Figure 16:
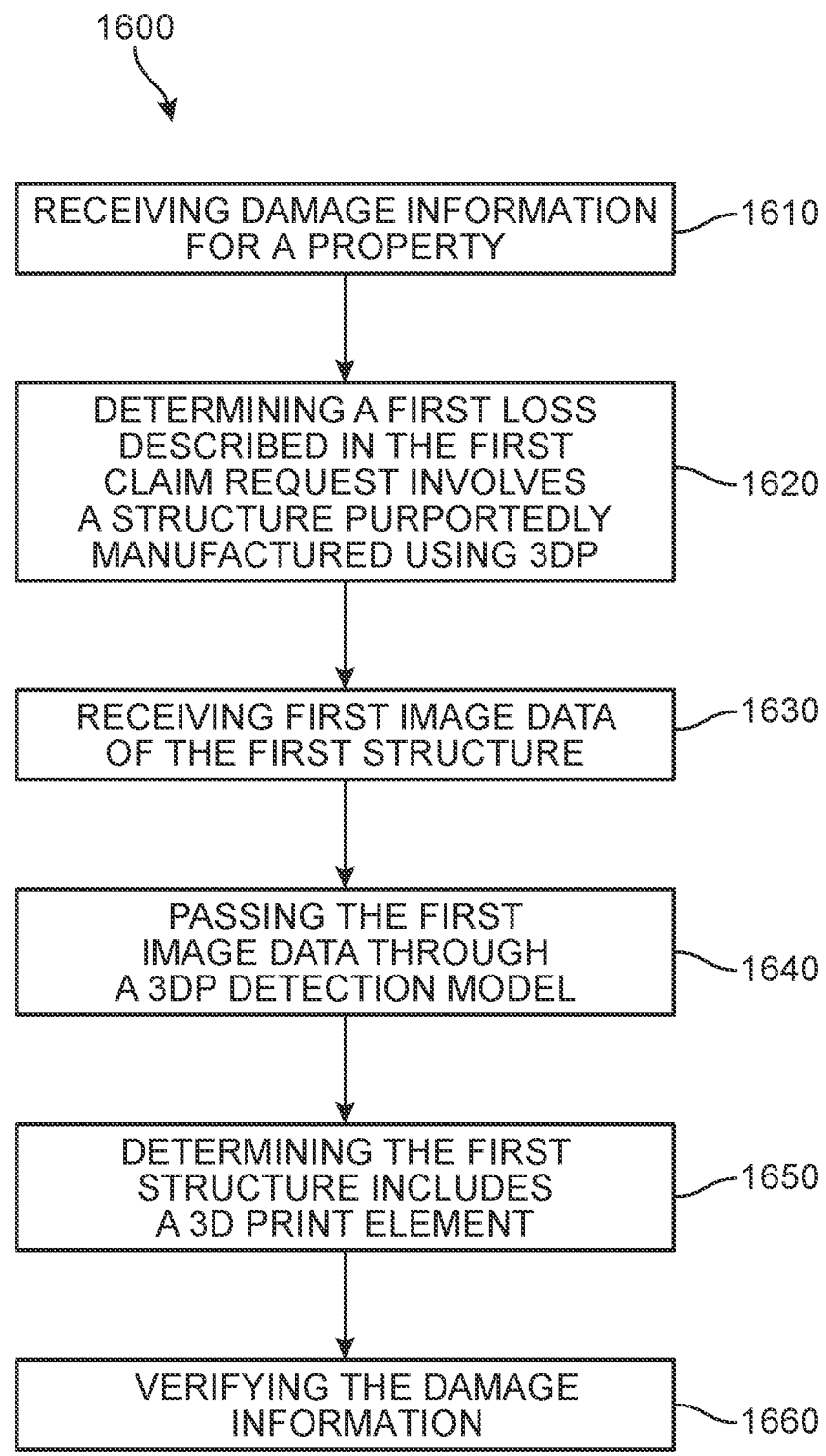
FIG. 16 is a flow chart depicting a process of verifying claims of damage to 3DP structures, according to an embodiment.

FIG. 16 is a flow chart illustrating an embodiment of a method 1600 of verifying damage to three-dimensional (3D) printed components. The method 1600 includes a first step 1610 of receiving, at a claim verification system, information indicating damage to a first property, and a second step 1620 of determining, at the claim verification system, that a first loss described in the information involves a first structure that was purportedly manufactured using 3D printing techniques. In addition, a third step 1630 includes receiving, at the claim verification system, first image data of the first structure, and a fourth step 1640 includes passing, at the claim verification system, the first image data through a 3D print detection model and generating a first output. Furthermore, the method 1600 includes a fifth step 1650 of determining, at the claim verification system and based on the first output, the first structure has a high likelihood of including at least a first portion that is associated with a first 3D print resource, and a sixth step 1660 of verifying, at the claim verification system and in response to the first portion being associated with the first 3D print resource, the information. At least a portion of the method is performed by a processing unit.

In other embodiments, the method 1600 may include additional steps or aspects. In one embodiment, verifying the information can trigger performance of a standard claim processing of a claim associated with the damage. In some embodiments, the first 3D print resource is one of a proprietary 3D print mixture or a 3D print manufacturer. In one example, the 3D print detection model further identifies a name of a 3D print manufacturer of the first portion. In another example, the 3D print detection model further identifies a name of a proprietary 3D print mixture comprising the first portion. In cases where the information indicates damage to a second portion that is 3D printed, the method can also include a step of determining, at the claim verification system, that the second portion is 3D printed is based on the first output, and verification of the information is based on a correspondence between the information and the first output regarding the second portion. In some embodiments, the method also includes adding the first image data to a record associated with the first property. In one embodiment, the method also includes generating a structural assessment based on the first output that classifies each portion of the first structure as being either 3D printed or not 3D printed. In some embodiments, the first image data is obtained by one of an aerial satellite, an aerial drone, and a member submission. In another example, the 3D print detection model is trained using a training dataset that includes images of structures built using 3D print techniques and structures built using masonry techniques.

Other methods may be contemplated within the scope of the present disclosure. For example, in some embodiments, a method of reducing the processing of fraudulent claims for damage to three-dimensional (3D) printed components is disclosed. The method includes a first step of receiving, at a claim verification system, a claim submission indicating damage to a first property, and a second step of determining, at the claim verification system, that a first loss described in the claim submission involves a first structure that was purportedly manufactured using 3D printing techniques. A third step includes receiving, at the claim verification system, first image data of the first structure, and a fourth step includes passing, at the claim verification system, the first image data through a 3D print detection model and generating a first output. In addition, the method includes a fifth step of determining, at the claim verification system and based on the first output, the first structure has a low likelihood of including any portion that is associated with a first 3D print resource and that the claim submission is thereby unsubstantiated, and a sixth step of initiating, at a claim management system and based on the unsubstantiated claim submission determination, a follow-up to obtain further data regarding the first structure and the claim submission. In other embodiments, the method may include additional steps or aspects. In one embodiment, the method also includes automatically adding the first image data to a record associated with the first property. In another embodiment, the method includes generating a structural assessment based on the first output that classifies each portion of the first structure as being either 3D printed or not 3D printed. In one example, the first image data is obtained by one of an aerial satellite, an aerial drone, and a member submission. In some examples, the 3D print detection model is trained using a training dataset that includes images of structures built using 3D print techniques and structures built using masonry techniques.

Figure 17:
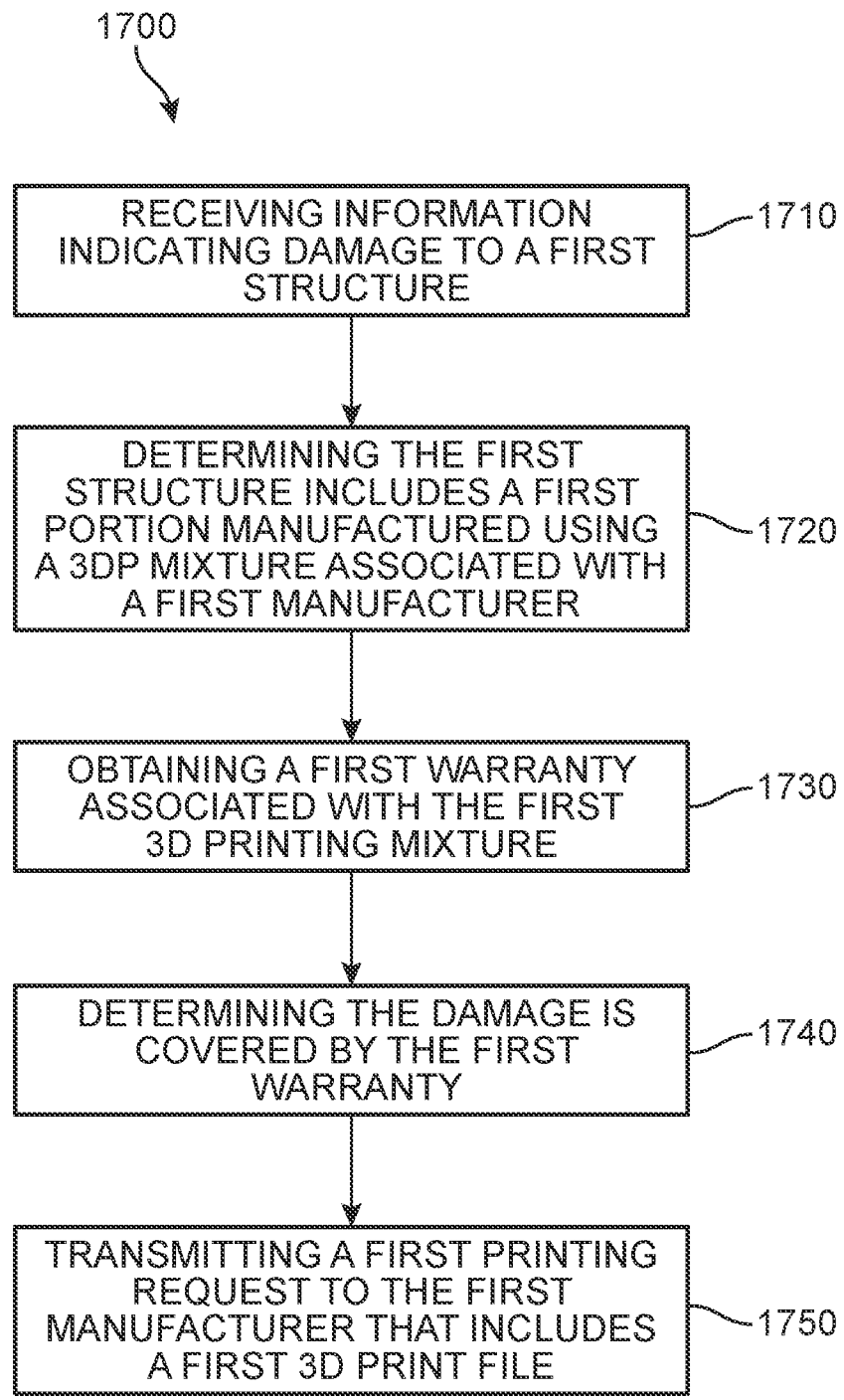
FIG. 17 is a flow chart depicting a process of transmitting pertinent data and/or the 3DP file to a manufacturer in fulfillment of a subrogation.

FIG. 17 is a flow chart illustrating an embodiment of a method 1700 of managing replacement of three-dimensional (3D) printed components. The method 1700 includes a first step 1710 of receiving, at a subrogation management system, information indicating damage to a first structure, and a second step 1720 of determining, at the subrogation management system, that a first loss described in the information involves a first portion of the first structure that include a first 3D print mixture associated with a first manufacturer. A third step 1730 includes obtaining, at the subrogation management system, a first warranty associated with the first 3D print mixture, and a fourth step 1740 includes determining, at the subrogation management system, that the damage is covered by the first warranty. In addition, the method 1700 includes a fifth step 1750 of transmitting, from the subrogation management system and to the first manufacturer, in response to the damage being covered by the first warranty, a first print request that includes a first 3D print file for the first portion.

In other embodiments, the method 1700 may include additional steps or aspects. In one embodiment, the first 3D print file is stored in a record associated with the first structure. In some embodiments, the method also includes steps of identifying, at the subrogation management system, a first builder of the first structure, and transmitting, from the subrogation management system, a request for the first 3D print file to the first builder. In some embodiments, the method also includes receiving the first 3D print file from a first builder who originally built the first structure. In another embodiment, the method includes a step of automatically adding the first 3D print file to a record associated with the first structure. In another example, the first warranty is one of a materials warranty and a manufacturer warranty. In some embodiments, the determination that the first portion includes the first 3D print mixture is based on a structural assessment that classifies each portion of the first structure as being either 3D printed or not 3D printed. In one embodiment, the structural assessment is generated based on image data obtained by one of an aerial satellite, an aerial drone, and a member submission. In some embodiments, the first print request further includes data describing the damage that supports coverage by the first warranty.

Other methods may be contemplated within the scope of the present disclosure. For example, in some embodiments, a method of managing replacement of three-dimensional (3D) printed components is disclosed. The method includes a first step of receiving, at a subrogation management system, a claim submission indicating damage to a first structure that includes a first component, the damage including a defect in the first component, and a second step of receiving, at the subrogation management system, first image data of the first component. A third step includes determining, at the subrogation management system and based on the first image data, the first component was printed by a first manufacturer, and a fourth step includes determining, at the subrogation management system, the defect falls within a scope of a warranty associated with the first component. The method also includes a fifth step of transmitting, from the subrogation management system and to the first manufacturer, in response to the defect falling within the scope of the first warranty, a first print request that includes a first 3D print file for the first component. In other embodiments, the method may include additional steps or aspects. In one embodiment, the method also includes a step of automatically adding the first image data to a record associated with the first structure. In some embodiments, the first image data is obtained by one of an aerial satellite, an aerial drone, and a member submission (for example, images captured via a mobile device).

Figure 18:
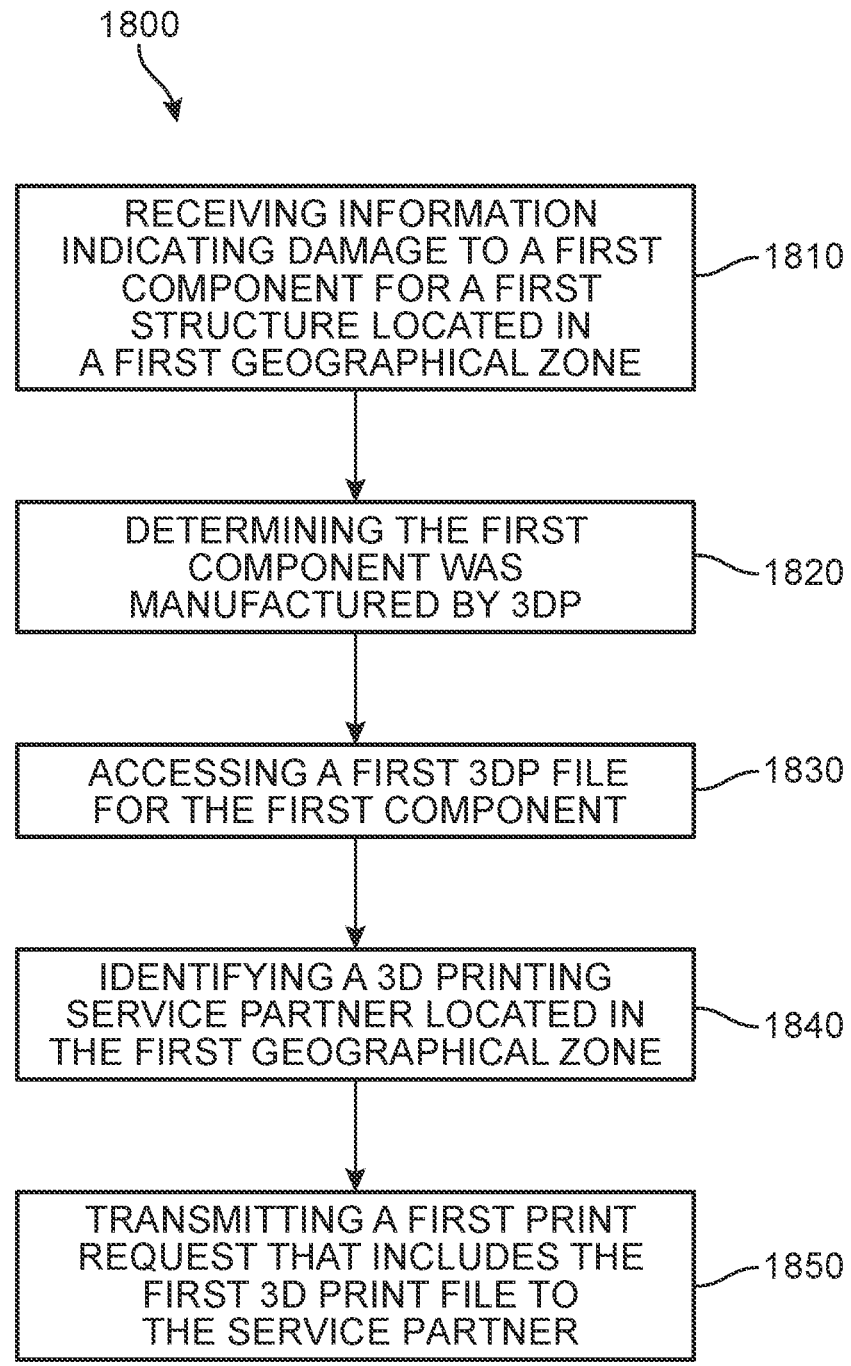
FIG. 18 a flow chart depicting a process of managing the replacement of a 3DP component on behalf of an insured member, according to an embodiment.

FIG. 18 is a flow chart illustrating an embodiment of a method 1800 of managing replacement of three-dimensional (3D) printed components. The method 1800 includes a first step 1810 of receiving, at a component recovery system, information indicating damage to a first structure located in a first geographical zone, and a second step 1820 of determining, at the component recovery system, that a first loss described in the information involves a first component of the first structure that was manufactured using 3D printing. In addition, a third step 1830 includes accessing, at the component recovery system, a first 3D print file for the first component, and a fourth step 1840 includes identifying, at the component recovery system, a first 3D printing service partner located in the first geographical zone. Furthermore, the method 1800 includes a fifth step 1850 of transmitting, from component recovery system and to the first 3D printing service partner, a first print request that includes the first 3D print file.

In other embodiments, the method 1800 may include additional steps or aspects. In one embodiment, the first 3D print file is stored in a record associated with the first structure. In another embodiment, the method also includes steps of identifying, at the component recovery system, a first builder of the first structure, and transmitting, from the component recovery system, a request for the first 3D print file to the first builder. In some embodiments, the method also includes a step of receiving the first 3D print file from a first builder who originally built the first structure. In one embodiment, the method includes automatically adding the first 3D print file to a record associated with the first structure. In some embodiments, the method can further include steps of receiving, from the first 3D printing service partner, an estimated completion date for production of a replacement of the first component, and automatically assigning a first contractor to install the replacement in the first structure. In another example, the determination that the first component was manufactured using 3D printing is based on a structural assessment that classifies one or more components of the first structure as being either 3D printed or not 3D printed. In some embodiments, the structural assessment is generated based on image data obtained by one of an aerial satellite, an aerial drone, and a member submission. In another example, the method can also include steps of receiving, at the component recovery system, a plurality of bids, each bid of the plurality of bids being submitted from an individual contractor, presenting, via an app for the component recovery system, each of the contractors as a selectable option, receiving, via the app, a selection of a first contractor, and assigning and authorizing the first contractor to install the replacement in the first structure. In one example, the method can include determining, at the component recovery system, the damage falls outside a scope of a manufacturer warranty associated with the first component.

Other methods may be contemplated within the scope of the present disclosure. For example, in some embodiments, a method of managing replacement of three-dimensional (3D) printed components is disclosed. The method includes a first step of receiving, at a component recovery system, a first claim request involving damage to a first component for a first structure located in a first geographical zone, and a second step of transmitting, from the component recovery system and to a first 3D printing service partner also located in the first geographical zone (the service partner being selected because of its proximity to the first structure in the first geographical zone), a first printing request that includes a first 3D print file for the first component. A third step includes receiving, at the component recovery system and from the first 3D printing service partner, an estimated completion date for production of the first component, and a fourth step includes assigning, by the component recovery system, an installation of the first component to a first contractor. The method can also include a fifth step of providing, via the component recovery system, authorization to the first contractor to retrieve the first component from the first 3D printing service partner on or after the estimated completion date. In other embodiments, this method may include additional steps or aspects. In one embodiment, the method also includes selecting the first contractor from a directory of contractors who have pre-established relationships with the component recovery system. In some embodiments, the first contractor is selected and/or approved via an app by a member on whose behalf the first claim request was generated.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

In different embodiments, the display of the computing device may present information and various media for a product/service support software application ("app"). In some embodiments, the app is associated with the provider of the product/service for which the end-user is employed. In some embodiments, the end-user can receive and send information through a user interface that may be presented on a display for the device. In some embodiments, the display may be a touchscreen, allowing the end-user to interact with the user interface directly by touch. The user interface may refer to an operating system user interface or the interface of one or more software applications that may run on the computing device. In some embodiments, the user interface can include a messaging window or other chat-space by which the employee/agent (MSR) may send messages or other digital content. In different embodiments, the computing device is part of or in communication with a computing system which provides access to the components, modules, and systems of FIG. 8.

In one embodiment, computing devices could operate in a client-server relationship with one or more servers of computer system for the damage classification system. For example, the computer system may include a server that communicates with computing devices, as well as other remote devices (e.g., user devices of other customers) over a network. The computing devices may provide the front-end of a system that provides users with options for performing various kinds of tasks (for example, making fund transfers when the company is a bank). In some cases, computing devices may run client software through a web browser, in which case the client software may be hosted on a server associated with the authentication computer system. In other cases, computing devices may run client software in the form of a native software application that has been downloaded through a centralized marketplace (i.e., an "app store"). In some cases, while the client software that allows users to perform various tasks may be run on computing devices, the data may be retrieved from and stored on databases associated with authentication computer system (e.g., databases).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The term "computer system" refers to the computing resources of a single computer, the partial computing resources of a single computer, a plurality of computers communicating with one another, or a network of remote servers. In one embodiment, computer system includes at least one server having at least one processor. In different embodiments, the computer system includes one or more computing devices (for example, a server) that may be in communication with one or more databases. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, the computer system may also include or be configured with access to one or more components of environment 800 in FIG. 8.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device (s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of verifying damage to three-dimensional (3D) printed components, the method comprising:
   inputting, into a 3D print detection machine learning (ML) model for a claim verification system annotated image data that include examples of masonry structures, 3D print structures, and structures built with both 3D print portions and masonry-built portions, wherein the annotated image data trains the 3D print detection ML model to detect specific indicators of 3DP techniques including one or more of:
   a material's aggregates' size,
   the material's apparent water/cement ratio, and
   a presence of a mixture used exclusively or primarily in 3D print builds;
   receiving, at the claim verification system, information indicating damage to a first property purportedly manufactured using 3D printing techniques;
   receiving, at the trained 3D print detection ML model, first image data of the first structure;
   determining, at the trained 3D print detection ML model and based on the first image data, the first structure has a high likelihood of including at least a first portion that is associated with a first 3D print resource due to detection of one or more 3D print indicators in the first portion; and
   verifying, at the claim verification system, the first property was manufactured with 3D printing.

2. The method of claim 1, further comprising determining, via the trained 3D print detection ML model, that the first portion's material aggregates' size is no more than 300 μm.

3. The method of claim 1, further comprising determining, via the trained 3D print detection ML model, that the first portion's material water/cement ratio is between 0.3 and 0.4.

4. The method of claim 1, further comprising determining, via the trained 3D print detection ML model, that the first portion's material includes a certain percentage of copper tailings.

5. The method of claim 1, further comprising determining, via the trained 3D print detection ML model, that the first portion includes two different proprietary 3D print mixtures.

6. The method of claim 1, further comprising automatically adding the first image data to a record associated with the first property.

7. The method of claim 1, further comprising generating a structural assessment based on the first output that classifies each portion of the first structure as being either 3D printed or not 3D printed.

8. The method of claim 1, wherein the first image data is obtained by one of an aerial satellite, an aerial drone, and a member submission.

9. The method of claim 1, further comprising determining, via the trained 3D print detection ML model, that the first portion's material is characterized by a certain percentage of coarse sand.

10. A method of reducing the processing of fraudulent claims for damage to three-dimensional (3D) printed components, the method comprising:
inputting, into a 3D print detection machine learning (ML) model for a claim verification system annotated image data that include examples of masonry structures, 3D print structures, and structures built with both 3D print portions and masonry-built portions, wherein the annotated image data trains the 3D print detection ML model to detect specific indicators of 3DP techniques including one or more of:
a material's aggregates' size,
the material's apparent water/cement ratio, and
a presence of a mixture used exclusively or primarily in 3D print builds;
receiving, at a claim verification system, a claim submission indicating damage to a first property;
determining, at the claim verification system, that a first loss described in the claim submission involves a first structure that was purportedly manufactured using 3D printing techniques;
receiving, at the claim verification system, first image data of the first structure;
passing, at the claim verification system, the first image data through the 3D print detection ML model and generating a first output;
determining, at the claim verification system and based on the first output, the first structure has a low likelihood of including any portion that is associated with a first 3D print resource and that the claim submission is thereby unsubstantiated; and
initiating, at a claim management system and based on the unsubstantiated claim submission determination, a follow-up to obtain further data regarding the first structure and the claim submission.

11. The method of claim 10, further comprising automatically adding the first image data to a record associated with the first property.

12. The method of claim 10, further comprising generating a structural assessment based on the first output that classifies each portion of the first structure as being either 3D printed or not 3D printed.

13. The method of claim 10, wherein the first image data is obtained by one of an aerial satellite, an aerial drone, and a member submission.

14. The method of claim 10, further comprising determining, at the trained 3D print detection ML model and based on the first image data, the first structure has a high likelihood of including at least a first portion that is associated with a first 3D print resource due to detection of one or more 3D print indicators in the first portion.

15. A system for verifying damage to three-dimensional (3D) printed components, the system comprising a processor and machine-readable media including instructions which, when executed by the processor, cause the processor to:
input, into a 3D print detection machine learning (ML) model for a claim verification system annotated image data that include examples of masonry structures, 3D print structures, and structures built with both 3D print portions and masonry-built portions, wherein the annotated image data trains the 3D print detection ML model to detect specific indicators of 3DP techniques including one or more of:
a material's aggregates' size,
the material's apparent water/cement ratio, and
a presence of a mixture used exclusively or primarily in 3D print builds;
receive, at the claim verification system, information indicating damage to a first property purportedly manufactured using 3D printing techniques;
receive, at the trained 3D print detection ML model, first image data of the first structure;
determine, at the trained 3D print detection ML model and based on the first image data, the first structure has a high likelihood of including at least a first portion that is associated with a first 3D print resource due to detection of one or more 3D print indicators in the first portion; and
verify, at the claim verification system, the first property was manufactured with 3D printing.

16. The system of claim 15, further comprising determining, via the trained 3D print detection ML model, that the first portion's material aggregates' size is no more than 300 μm.

17. The system of claim 15, further comprising determining, via the trained 3D print detection ML model, that the first portion's material water/cement ratio is between 0.3 and 0.4.

18. The system of claim 15, further comprising determining, via the trained 3D print detection ML model, that the first portion's material includes a certain percentage of copper tailings.

19. The system of claim 15, wherein the instructions further cause the processor to determine, via the trained 3D print detection ML model, that the first portion includes two different proprietary 3D print mixtures.

20. The system of claim 15, wherein the instructions further cause the processor to generate a structural assessment based on the first output that classifies each portion of the first structure as being either 3D printed or not 3D printed.

* * * * *